United States Patent [19]

Fujimura et al.

[11] Patent Number: 5,666,450
[45] Date of Patent: Sep. 9, 1997

[54] OPTICAL-AXIS ALIGNMENT METHOD, OPTICAL-AXIS ALIGNMENT DEVICE, INSPECTION METHOD OF OPTICAL DEVICES, INSPECTION DEVICE OF OPTICAL DEVICES, METHOD OF PRODUCING OPTICAL MODULE, AND APPARATUS OF PRODUCING OPTICAL MODULE

[75] Inventors: Yasushi Fujimura; Yoshiki Kuhara; Naoyuki Yamabayashi, all of Osaka, Japan

[73] Assignee: Sumitomo Electric Industries,Ltd., Osaka, Japan

[21] Appl. No.: 697,248

[22] Filed: Aug. 21, 1996

[30] Foreign Application Priority Data

Aug. 22, 1995 [JP] Japan ................................. 7-237745

[51] Int. Cl.⁶ ...................................... G02B 6/26
[52] U.S. Cl. ........................ 385/93; 385/90; 385/91; 385/147; 385/35; 359/900
[58] Field of Search ........................ 385/88–94, 147, 385/33, 34, 35; 359/900

[56] References Cited

U.S. PATENT DOCUMENTS

| H551 | 12/1988 | Chaoui et al. | 385/90 |
|---|---|---|---|
| 4,720,163 | 1/1988 | Goodwin et al. | 385/90 |
| 5,029,965 | 7/1991 | Tan | 385/90 |
| 5,168,321 | 12/1992 | Gregory et al. | 356/152 |
| 5,217,906 | 6/1993 | Abbott et al. | 385/94 |
| 5,324,954 | 6/1994 | Oikawa | 250/561 |
| 5,367,140 | 11/1994 | Jouaneh et al. | 219/121.64 |

FOREIGN PATENT DOCUMENTS

| 0 602 476 | 6/1994 | European Pat. Off. . |
| 2 239 091 | 6/1991 | United Kingdom . |

OTHER PUBLICATIONS

Maigne et al, "An InGaAs–InP Position–Sensing Photodetector", IEEE Journal of Quantum Electronics, vol. 26, No. 5, May 1990, pp. 820–823.

*Primary Examiner*—John Ngo
*Attorney, Agent, or Firm*—Cushman Darby & Cushman IP Group of Pillsbury Madison & Sutro, LLP

[57] ABSTRACT

Alignment between an optical fiber and a laser diode is carried out by the steps of fixing a position sensitive detector and an optical fiber on a common supporting device, arranging a position sensitive detector opposite the laser diode, measuring the converging point of the light beams from the laser, calculating the difference between the converging point and the optical fiber, displacing the optical fiber relative to the laser diode by the calculated difference for harmonizing the converging point with the center of the optical fiber within a tolerance, moving minutely the optical fiber with the laser in the direction for increasing the light power emitted from the other end of the optical fiber and fixing the optical fiber at the point which gives the maximum power to the optical fiber.

60 Claims, 13 Drawing Sheets

OPTICAL-AXIS ALIGNMENT SYSTEM in Z-direction in X-direction or in Y-direction

ALIGNMENT METHOD $A_0$: initial position
$A_1$: $Pf = Pf_0$
$A_2$: $Pf = Pf_{max}$ The relation between the incident light power and the seeking time Bottom view of the sensor supporting plate Vertically sectional view of the sensor supporting plate Vertically sectional view of the PSD chip An array of electrodes positioned on the top surface of the PSD chip PSD device mounting the PSD chip in a package Semiconductor laser module semiconductor laser module The axis-alignment operation between an optical fiber and an optical waveguide Axis-alignment operation
between a semiconductor laser array and an optical waveguide

OPTICAL-AXIS ALIGNMENT METHOD, OPTICAL-AXIS ALIGNMENT DEVICE, INSPECTION METHOD OF OPTICAL DEVICES, INSPECTION DEVICE OF OPTICAL DEVICES, METHOD OF PRODUCING OPTICAL MODULE, AND APPARATUS OF PRODUCING OPTICAL MODULE

FIELD OF THE INVENTION

This invention relates to an optical axis-alignment method and an optical axis-alignment device that are cardinal in combining various optical parts, e.g. semiconductor lasers, photodetectors, optical waveguides, and so on for optical communication and optical measurement with optical fibers, or their arrays, and further relates to an inspection method and an inspection device utilizing the said axis-alignment method, and furthermore relates to a method of producing an optical module and an apparatus of producing an optical module utilizing the said axis-alignment method.

BACKGROUND OF THE INVENTION

This invention claims the priority based on Japanese Patent Application No. 237745/1995, filed Aug. 22, 1995.

Optical axis-alignment means that each optical axis of optical pars, e.g. a light emitting device, a photodetector, an optical waveguide and so on, is aligned with each optical axis of a lens and an optical fiber on a direct line. First of all, the necessity of optical axis-alignment will be explained.

Semiconductor lasers, photodetectors or optical waveguides used for optical communication are capable of fulfilling their functions only by coupling them with an optical fiber with high efficiency. If the coupling efficiency between an optical part and an optical fiber is low, many disadvantages occur. Low coupling efficiency causes, for example, an extremely high loss of optical energy, a short transmission distance and a low signal/noise ratio (S/N ratio). To surmount these impediments, conventionally each optical part is aligned to an optical fiber at a place which maximizes the coupling efficiency.

Further, when the properties of optical devices are examined, the coupling efficiency between each optical device and an optical fiber and the light wavelength which the device emits at the most suitable position are inspected. High-accurate optical axis-alignment is is indispensable in any case.

Conventional optical axis-alignment techniques, and their disadvantages will be explained by citing a semiconductor laser as an example.

A typical structure of a semiconductor laser will be explained according to FIG. 1. A semiconductor laser chip (1) and a monitoring photodiode (2) are put in positions on a straight line in a package of the semiconductor laser. When the light having a 1.3 µm wavelength is, for example, used for optical communication, the laser chip (1) having a light emitting layer made of InGaAsP is used. The semiconductor laser chip (1) is, for example, fixed to a side surface of a protrusion (23) of a metallic header (3) made of Fe (iron), Fe—Ni (iron-nickel) alloy and so forth, wherein a submount (7) made of AlN is sandwiched between the laser chip (1) and the protrusion (23).

Further, the monitoring photodiode (2) is equipped behind the laser chip (1) in order to keep output of the laser constant. The photodiode chip (2) is fixed to the slanting bottom surface of the header (3) via the ceramic sub-mount (8) made of alumina ($Al_2O_3$). Each of the laser chip (1) and the photodiode (2) is connected to some one of a plurality of lead pins (4) respectively with gold wires. The photodiode (2) and the laser chip (1) are able to be electrically connected to outer circuits through the lead pins (4). A cylindrical cap (5) equipped with a spherical lens (6) is fixed on an upper surface of the header (3) with laser welding. The semiconductor laser (1), the photodiode (2) and the head parts of the lead pins (4) are sealed in vacuum by the cap (5). The interior of the cap (5) is filled with an inert gas as to increase the reliability of the devices. The spherical lens (6) installed in the cap (5) plays the role of enhancing the coupling efficiency. In this case, the cap (5) and the spherical lens are unified in one body, but there is another example that a header is sealed in vacuum by a cap equipped with a window of a flat glass board, and a lens is positioned the outside of the window without unifying the cap and the lens. The laser diode (1) emits light by supplying an electric current to the laser chip through the lead pins (4). The light output of the laser diode (1) is monitored by the monitoring photodiode (2). The output of the photodiode (2) is in proportion to the light output. The driving current of the laser diode is controlled as retaining the output of the photodiode at a constant value. An optical fiber (9) is placed at the outside of the semiconductor laser body, and an end of the optical fiber (9) is opposite to the spherical lens (6) with a little space. Each axis of the semiconductor laser chip (1), the photodiode (2) and the spherical lens (6) has already been aligned at the time of producing the device. Here, the optical device group including the semiconductor laser chip (1), the photodiode (2) and the spherical lens (6) is a first optical device, and the optical fiber (9) is a second optical device. The optical axis-alignment proposed by the present invention is identical with aligning the axis of the first device with the axis of the second device (optical fiber). Since the first device can focus light by the spherical lens, the intensity of the light entering the optical fiber (5) is maximized by disposing the end surface of the optical fiber right at the focal point. The alignment is carried out by moving the optical fiber relatively not only in the directions orthogonal to the optical axis (X-Y plane) but also in the directions parallel to the optical axis (Z-axis direction).

An ordinary method of optical axis-alignment will be summarized by referring to FIG. 2. An optical fiber (9) is opposite to a light emitting device (semiconductor laser) (16) with a built-in laser diode (1). The laser emits light by supplying an electric current from a driving electric power source (10). The laser chip (1) emits light at a constant optical power by controlling the driving current by a monitoring photodiode (2). An end of an optical fiber (9) is opposite to the light emitting device (16). The end part of the optical fiber (9) is supported by an XYZ driving system (14). The other end of the optical fiber (9) is connected to a light power meter (11) that is connected to a controller (12). The controller (12) gives a controlling signal (13) to the XYZ driving system (14). The semiconductor laser (16) emits light at a constant output, and the optical power passing through the optical fiber (9) is monitored by the light power meter (11). The XYZ driving system (14) makes the optical fiber (14) move in X and Y directions vertical to the optical axis (XY plane) and in Z direction parallel to the optical axis, and seeks the position where the coupling light intensity Pf is the largest. It is feasible to obtain the coupling light intensity Pf at an arbitrary position of the optical fiber (14) due to the combination of the light power meter (11), the controller (12) and the XYZ driving system (14). The coupling light intensity Pf is maximized at the point where the laser light is focused by the lens. When the position where Pf is the largest is found out, the end part of the optical fiber is maintained at the position. Inspection data are obtained by measuring the output power and the wavelength from the fiber. These procedures mean optical axis-alignment for inspecting a semiconductor laser and so forth.

Other purpose of an axis-alignments is a step of production. There is a pigtail type laser module, which is produced by fixing a ferrule of a fiber to a housing of a semiconductor laser at the position of maximizing Pf (the most suitable coupling position). This is an axis-alignment for accomplishing the most effective coupling between a light emitting device and an optical fiber. Otherwise, when a high output is not necessary or is troublesome, an end part of the optical fiber is intentionally shifted from the position where Pf is maximized, whereby a predetermined intensity of light is possible to enter the optical fiber. The properties of the laser module can be inspected, or the laser module is fixed at the shifted position.

As explained above, when optical devices are examined or optical devices are coupled with an optical fiber, the most suitable coupling position (the position of maximizing Pf) is firstly sought by moving the optical fiber in X and Y directions orthogonal to the optical axis and in Z direction parallel to the optical axis. Hence, finding out the most suitable coupling position is a primarily necessary operation. There is, however, a difficulty of wasting so much time for seeking the most suitable coupling position. The reasons why it takes much time to find out the most suitable coupling position will be explained.

One reason is that both a spot size Q of laser light focused by the lens and a core size W of an optical fiber receiving the light are small. The largest power of incident light accrues from the coincidence between the focus point Q and the optical fiber core W. Since such the small focus point Q is sought by moving the small core W, the distance to the most suitable coupling position would be extremely long from the starting point of search. For example, when the semiconductor laser of a 1.3 µm wavelength is focused, its spot size becomes several µm. In the case of a quartz-type single mode fiber, its core diameter is about 10 µm, which is absolutely small. Consequently, the optical fiber must be aligned with a high-accuracy in µm order, because the optical fiber must be put in the position where the coupling efficiency of the light focused by the lens is maximized. This procedure is extremely difficult.

FIG. 3 and FIG. 4 are graphs for explaining an example of the alignment tolerance between the semiconductor laser and the optical fiber. FIG. 3 is a graph showing the change of light power received by the optical fiber in the case of moving the optical fiber to the axial direction (Z-direction) from the most suitable coupling position. The abscissa indicates the distance in Z-direction from the most suitable coupling position. Z=0 means the most suitable position. As the position of the optical fiber separates from the most suitable coupling position, Z showing the distance moves to the right direction on the abscissa. As shown in FIG. 3, the range of Pf from 0 dB to −0.5 dB extends to about 160 µm in length. It is proved that the tolerance in Z-direction is large, so that the axis-alignment in Z-direction is easy to passable.

FIG. 4 is a graph showing the change of the light power received by the optical fiber while the optical fiber moves in X-direction or in Y-direction from the most suitable coupling position. The abscissa indicates the distance in X-direction or in Y-direction from the most suitable coupling position.

The most suitable coupling position is represented by X=0 and Y=0. The range of Pf from 0 dB to −0.5 dB has a short length of ±2.5 µm. Hence, the axis-alignment in X and Y directions needs a high accuracy of a tolerance less than 5 µm. It is known that the axis-alignment in X and Y directions is extremely difficult.

Second reason is that the positional accuracy in fabricating devices, e.g. semiconductor laser and so on, is low. Even if the semiconductor laser is set in a measuring device, and the optical fiber is arranged at the position that seems to be nearly just above the lens; the deviation from the most suitable coupling position of the optical fiber is about plus or minus several hundreds of µm square, that indicates an initial gap (deviation) between the set-position of the semiconductor laser and the initial position of the optical fiber. In addition to this gap, there exists another deviation of the chip in the package of the semiconductor laser. The gap, that is generated between the initial position of the optical fiber and the most suitable coupling position, is so large that the axis-alignment requires high accuracy. Actual axis-alignment procedure becomes a hard operation, because the most suitable coupling position of less than a 1 µm round must be searched in a square of several hundreds of µm. Here, a "search region" is defined to be the region of moving the optical fiber for seeking the most suitable coupling position. The search region expands in a several hundreds of µm square. It takes an enormous time to examine the whole search region from corner to corner. Therefore, some improvements were proposed in order to shorten the searching time.

FIG. 5 shows a conventional method of searching the most suitable coupling position. An initial position ($A_0$) of the optical fiber is set up as the focus point ($A_2$ point) of the semiconductor laser certainly exists anywhere in the whole search region (30) of, for example, a 500 µm square whose center is the initial position ($A_0$). The region capable of sensing a non-zero amount of laser light is called "scanning region (31)". The end part of the optical fiber is held to move freely. The optical fiber is positioned at $A_0$ point at the beginning. The sensing end of the optical fiber is moved by the XYZ driving system (14), keeping watch on the incoming light from the optical fiber by the light power meter (11) installed in another end of the optical fiber. The movement of the optical fiber starts from the center point $A_0$ of the search region (30), and proceeds along the routes (33), (34), (35), and (36) of a square type helical line. As long as the incident light to the optical fiber is almost zero, the optical fiber continues to move along the helical line, increasing the distance between the point $A_0$ and the route little by little. It is assumed that the non-zero light power enters the optical fiber at the moment of passing through a certain point $A_1$ of the scanning region (31). The helical movement of the optical fiber is finished, and the optical fiber runs in the direction of increasing light power, taking a zigzag course (37) and changing a direction of the movement slightly. Since the movement in the scanning region (31) is guided by the controller, observing the incident light power Pf, it is feasible to reach the most suitable coupling point $A_2$ in a short time. The maximum incident light power $Pf_{max}$ is detected at the point $A_2$. The helical movement in the period of detecting no light is called a "rough axis-alignment", and the zigzag movement, that is carried out after non-zero light power is detected at point $A_1$, is called a fine axis-alignment.

FIG. 6 is a graph showing the relation between the incident light power and the seeking time. There exists a period where the incident light power is zero at the beginning. This period is correspondent to the term of the helical movement of the optical fiber. At $T_1$ time from the beginning of the axis-alignment, the limited light power $Pf_0$ is firstly detected, which corresponds to point $A_1$. $T_1$ indicates the time of rough axis-alignment. After that, the optical fiber rises the light power gradient, so that the light power is rapidly increased. At the time of $(T_1+T_2)$, the end of the optical fiber arrived at the most suitable coupling position point $A_2$ where Pf equals to $Pf_{max}$, i.e. $Pf.=Pf_{max}$. The axis-alignment explained by referring to FIG. 5 is limited in XY plane. Actually, it is necessary to practice the axis-alignment in Z direction. There exists an axis-alignment of method of aligning in three directions X, Y and Z at the same time. Further, another axis-alignment method is proposed in which the alignment in Z direction is done after the search of the most suitable coupling position in XY plane has finished. In these systems, it takes one or two minutes for the time $T_1$ of rough axis-alignment. The time $T_2$ for the fine axis-alignment is 30 seconds to 60 seconds. For increasing the throughput of producing semiconductor lasers, the time $(T_1+T_2)$ for the axis-alignment is required to be more shorter. It is necessary to shorten the time of axis-alignment and to reduce expenditures.

There is another serious obstacle. A few semiconductor lasers incapable of emitting light are sometimes mixed in the products. These defects must be excluded. The judgement whether a semiconductor laser is defective or not cannot be done in the period $T_1$ of rough axis-alignment, because no light enters. As mentioned before, the optical fiber travels along the helical routes, however, even if the helical route from $A_0$ becomes much longer, no light can be detected by the defective laser. Hence, the rough axis-alignment time $T_1$ becomes excessively long for the defective ones. When the light from the semiconductor laser is not detected even if it takes a certain time $T_1$ for the rough axis-alignment, the semiconductor laser is judged to be rejected. Therefore, the axis-alignment comes to an end. In this method, the scanning begins from the no light condition, so that the detection of defective products requires an excessive long time. A new method, in which defective products are immediately detected and the axis-alignment procedures are eliminated for the useless products, is strongly desired. Visible light lasers suffer from the same problems as mentioned above. When a visible light semiconductor laser is used, an initial position can be set by an operator watching the light of the visible light semiconductor laser. Further, it is feasible to detect non-light devices. When an infrared light laser (emits the light with a wavelength of more than 0.9 µm) is, however, used, it is not easy to set the laser at an initial position. When semiconductor lasers emitting light with a wavelength of 1.3 µm and a wavelength of 1.5 µm are used, an initial position can not be established by observing with the eye.

OBJECTS AND SUMMARY OF THE INVENTION

It is an object of the present invention to provide an optical axis-alignment apparatus capable of aligning a semiconductor laser to an optical fiber, aligning a light emitting device to a photodetector, and aligning a light emitting device to a waveguide in a short time.

Another object of the present invention is to provide a method of optical axis-alignment enjoying a speedy adjustment.

A further object of the present invention is to provide a device capable of detecting and excluding defective light emitting devices promptly.

A further object of the present invention is to provide an inspection method of optical devices capable of inspecting properties of the optical devices in a short time by aligning each optical axis of the optical devices immediately.

A further object of the present invention is to provide an apparatus of inspecting optical devices capable of inspecting characteristics of the optical devices in a short time by aligning each optical axis of the optical devices immediately.

A further object of the present invention is to provide an apparatus of producing a light emitting device module wherein the module is made by aligning each axis of a laser diode and an optical fiber rapidly at the most suitable position.

A still further object of the present invention is to provide a method of producing a light emitting device module wherein the module is made by aligning each axis of a laser diode and an optical fiber rapidly at the most suitable position.

The reasons why the prior axis-alignment between the semiconductor laser and the optical fiber needs much time is already explained in the above head. Another prior method of improving this defect is further explained so far. In this method, the moving end of the optical fiber can search the most suitable coupling point by its helical movement, whereby the time of the axis-alignment is decreased slightly. Such an improvement is, however, not sufficient. The procedures of aligning each axis should be finished in still a shorter time. This requirement is strongly desired. Inventors of the present invention deliberated on a method of shorting the time of axis-alignment. In FIG. 6, the operation of searching light at the beginning is called a "rough axis-alignment($T_1$)", and the operation of sensing a part of light and searching the center point of light is called a "fine axis-alignment($T_2$)" as a matter of convenience. Most of the time of axis-alignment is dissipated for the rough axis-alignment. The time of the rough axis-alignment occupies about ⅔ of the entire time. Therefore, it is effective to shorten the time of the rough axis-alignment. As mentioned before, the rough axis-alignment is the movement of discovering the range of non-zero light. The end of the optical fiber is scanned as to seeking for light from the dark region where no light exists. Fundamentally, when the fiber finds out light is a statistical matter. Therefore, it is not easy to reduce the rough axis-alignment time. To solve this difficulty, such a statistical matter should be excluded from the movement of finding out light. Inventors envisioned that if the scanning region shown in FIG. 5 were found out in a moment, the time for the rough axis-alignment would be mostly eliminated. After the scanning region has been discovered, the end of the optical fiber is moved to the scanning region, and is scanned toward the direction of increasing light power.

This invention proposes a method of alignment having the steps of preparing a two-dimensional position sensitive device having a wide light receiving area, supporting an end part of an optical fiber by a three-dimensional driving system, discovering a point maximizing the light power (corresponding to the most suitable coupling position) in a moment by the two-dimensional position sensitive device, moving the end part of the optical fiber, and executing a fine axis-alignment. Since the scanning region is soon discovered by the two-dimensional position sensitive device, the conventional, time-consuming rough axis-alignment is not required. After the discovery of scanning region, the fine axis-alignment is carried out without delay. As a result, the time $T_1$ of rough axis-alignment is greatly shortened. The two-dimensional position sensitive device is simply called a PSD (position sensitive device). This device is used for the rough axis-alignment. The two-dimensional position sensitive device has a large square of a light receiving surface on the front surface of the device, four side electrodes positioned along four sides of the front surface respectively, and an electrode on the bottom surface of the device. A reverse bias voltage is applied between each side electrode and the rear side electrode. As soon as light enters the light receiving surface, a photocurrent flows into each electrode in accordance with the coordinates of incident light point, and the two-dimensional sensors position sensitive device sensors the two-dimensional position of the incidence of light from the ratio of photocurrents flowing from four electrodes. The position sensitive device is a semiconductor device having a wide light receiving surface, so that there exist only PSDs made of Si (silicon).

An ordinary semiconductor photodetecting device has two electrodes in both sides of a pn-junction, and the pn-junction is reversely biased. Electron-hole pairs generated by the incidence of light flow toward the electrodes, which is a photocurrent. The semi-conductor photodetecting device is capable of sensing the incidence of light by the photocurrent. In this case, since the semiconductor photodetecting device aims at the detection of incident light and its light power, the light receiving region is formed to be narrow. The narrower the light receiving region becomes, the faster the response becomes. Therefore, an extremely narrow light receiving region is usually produced. Si (silicon) photodiodes are most generally used as a photodiode. It is feasible for silicon photodiodes to form both a narrow light receiving region and a width light receiving region. Silicon can, however, detect only visible light because of its wide bandgap. Ge photodiodes and InGaAs photodiodes are sensitive to infrared light, because these materials have a narrower bandgap than silicon. Since a Ge photodiode consists of a single material, it is feasible to make a device having a comparatively wide light receiving surface. Ge photodiodes with a diameter of 10 mm can be made at the present time, but Ge photodiodes have the defects of a big dark current and a large temperature dependency. InGaAs photodiodes have a small dark-current, but it is impossible to make an InGaAs photodiode with a large diameter.

At the present time, the semiconductor two-dimensional position sensitive devices cannot be made except for Si semiconductor. Obtainable one is only a Si semiconductor position sensitive device for visible light. For example, a wide p-type region is made on an n-type substrate, whereby a wide pn-junction is formed. An n-side electrode is formed in a reverse surface of the substrate, and four p-side electrodes are formed along four sides of the p-type region. Reverse bias voltage is applied between the n-side electrode and each p-side electrode independently. Ratios of the currents flowing into four electrodes are varied by the incident light position on the light receiving surface. Therefore, it is possible to determine the incident light position from the ratios. This PSD is, for example, utilized for a distance measuring equipment. An image of an object is focused on a position sensitive device (PSD) by a lens, and angles between the axes and the line directed to the object are obtained by measuring the deviations of the image from the center. The distance to the object can be calculated by the trigonometrical survey. Further, this PSD is used for retaining a pair of photodiode and light emitting device as rigorously being opposite to each other in the optical communication between two distanced movable vehicles, e.g. ships and so on.

A Si position sensitive device is available for the axis-alignment of semiconductor lasers for visible light, but can not detect the semiconductor laser light having a longer wavelength of 1.3 µm or 1.55 µm which is utilized for optical communication. There exists no semiconductor position sensitive device for infrared light. The Inventors of the present invention propose a novel two-dimensional position sensitive device for infrared light.

A semiconductor position sensitive device is an indispensable component element of this invention. A Si position sensitive device for visible light has already been produced. A position sensitive device for infrared light has never been produced yet. This invention proposes a position sensitive device for infrared light. First of all, how to detect the incident position of infrared laser light will be explained, and then a structure of the position sensitive device for infrared light and a method of producing same will be described. Further, an optical axis-alignment of the present invention, which is a main object, will be specified.

The present invention searches a focus point of the first optical device by the position sensitive device in a moment, moves the optical fiber to the focus point, and further moves the fiber in the direction of increasing the light power in order to discover the most suitable coupling position. After that, the inspection of the semiconductor laser is carried out, or a laser module coupling a semiconductor laser with an optical fiber is produced. The time expended for axis-alignment procedures is extremely reduced. The inspection of optical devices and the production processes can be decreased, so that costs can be cut down. The present invention has three novelties, ①the use of a position sensitive device for the rough axis-alignment, ②the axis-alignment utilized for infrared light lasers, and ③the new position sensitive device for infrared light.

Three novelties will be explained in detail.

①The present invention makes use of the semiconductor position sensitive device (PSD). The position sensitive device can search a focus point of light entering everywhere in a wide light receiving surface. Therefore, it is feasible to calculate the position of focus point in a moment as long as the PSD is set to allow the light to enter the light receiving surface. Further, since the PSD is a semiconductor device, it is compact and light, and its speed of response is so fast. The position sensitive device is suitable for coupling with an optical fiber which is light and thin. Since the PSD is a small sized device, it is easily installed to the optical fiber alignment device only by enlarging the head slightly. Si position sensitive devices for visible light have already been on the market. A Si position sensitive device has a light receiving region of from several mm square to 10 mm square, which is sufficiently wide, and has a sufficient resolution of 10 µm. Once a part of light enters the light receiving surface by moving the optical fiber in front of the PSD, such high resolution can search out a fine axis-alignment at once. Otherwise it would be possible to search the focus position by using TV cameras, e.g. image tubes, CCD cameras instead of the PSD, because the measurement requires only two dimensional coordinates of the focus point. The camera has, however, a large size and a heavy weight. The inertia of camera is also large. Therefore, it would be impossible to carry out the axis-alignment in XYZ directions by moving the heavy camera that is fixed to the same supporting stand as the fiber. The balance between the TV camera and the optical fiber is bad. A camera requires the image processing for determining the position of a point in a screen. Processing circuits would be complicated and highly expensive. The present invention, which adopts the position sensitive device capable of keeping a balance with the optical fiber in size and weight, succeeds in a speedy and precise axis-alignment by using the cheap device.

② The present invention is the most suitable for the axis-alignment of laser emitting invisible infrared light. This invention can discover a focus point of infrared light in a moment by combining the infrared position sensitive device with the optical fiber. In the case of infrared light, the axis-alignment has been more difficult in the prior method, because the forward focus point is not sensed by eye. In the present invention, however, there is no problem in finding the forward focus point due to the position sensitive device. When the infrared laser is used, it is impossible to discover whether light is emitted or not by eye sight. The position sensitive device can easily sense whether the light is emitted or not. The lack of light power is further sensed ③ The present invention has the novelty of developing and using an infrared position sensitive device having an InGaAs light receiving surface having a sufficient sensitivity in the wavelength bands, for example, 1.3 μm, 1.48 μm, 1.55 μm, 1.65 μm and so on, which are preferably used for the optical communication. Si position sensitive devices have already been on the market, but an infrared position sensitive device has never been produced or put on the market. Ge photodiodes have been utilized for infrared light as a photodiode. Ge allows to produce a device having a wide light receiving surface, but is incapable of giving a sufficient position resolution to weak light because of its large dark current. There has been InGaAs photodiodes sensitive to infrared light. Since the InGaAs semiconductor is a mixed crystal, it has been difficult to make a large-sized InGaAs crystal excellent in uniformity without defects. The Inventors of the present invention have succeeded in producing an InGaAs position sensitive device having a light receiving layer. This is shown by FIG. 13. The area of the light receiving region is 3.5 mm×3.5 mm, which is extremely large. The position of a light point and the photocurrents are linear in the range within a 2 mm diameter. Such an infared light device has never been existed till the Inventors have made it. This InGaAs semiconductor position sensitive device is novel itself and the use of it is also novel.

DETAILED DESCRIPTION OF THE PREFERRED EMBODIMENTS

Figure 7:
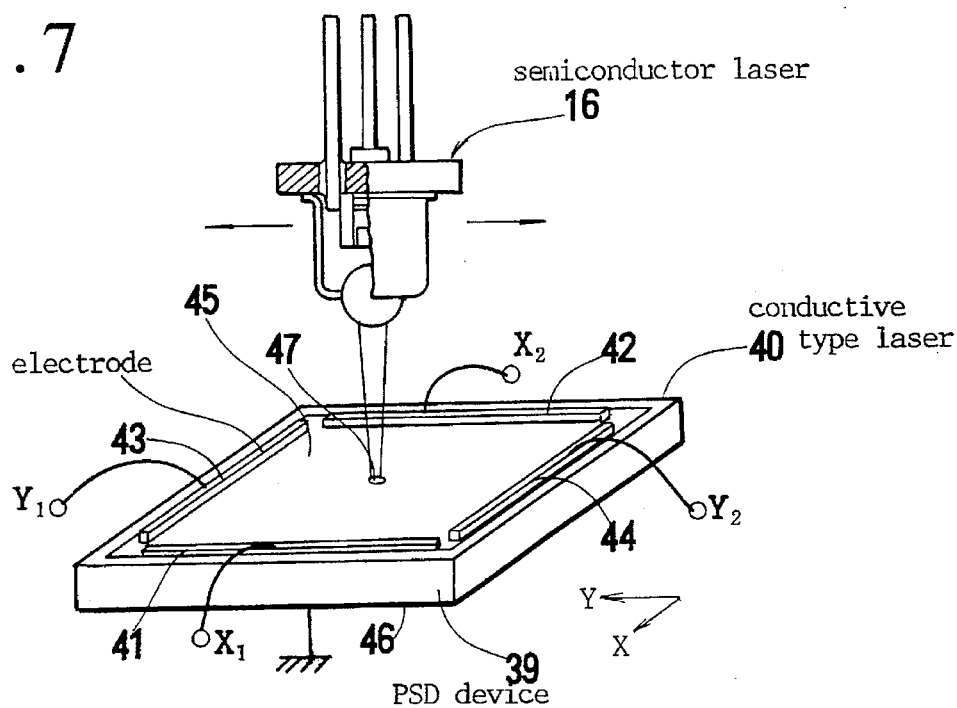
FIG. 7 is a schematic perspective view for explaining the relationship between a position sensitive device and a semiconductor laser.

FIG. 7 shows the relationship between the position of a semiconductor position sensitive device and the position of a semiconductor laser. The position sensitive device (PSD device) (39) is set in the vicinity of the position where the light from the semiconductor laser (16) is converged. The PSD device (39) has a square semiconductor layer (40). Four independent linear electrodes (41), (42), (43) and (44) are installed along four sides of a first conductive type layer (p-type or n-type) (40) respectively. $X_1$ electrode (41) and $X_2$ electrode (42) are formed along two sides parallel to y-axis. $Y_1$ electrode (43) and $Y_2$ electrode (44) are formed along two sides parallel to x-axis. Four electrodes (41), (42),

(43) and (44) are in an ohmic contact with the semiconductor layer (40). Four electrodes are independent each other. A light receiving region (45) is surrounded by four linear electrodes positioned along four sides of the semiconductor layer (40). Now, it is assumed that a two-dimensional coordinate XY has an origin at the center of the light receiving region (45). The whole of the bottom of the semiconductor (40) is a second conductive type layer (n-type or p-type) reverse to the light receiving region (45). A planar electrode (46) is formed on the reverse surface of the semiconductor (40). The pn-junction is formed here as well as an ordinary photodiode, and a reverse-bias is applied between the bottom electrode and the four front electrodes. If light enters the light receiving region (45), electron-hole pairs are generated at an incident point (47), and induce photocurrents, wherein the first type carriers flow to the bottom electrode and the second type carriers flow to all of the front four electrodes (41) to (44). A larger number of photocurrents flow to nearer electrodes, while a smaller number of currents flow to farther electrodes. X coordinate of the incident point (47) is obtained by the difference or the ratio of the photocurrents between $X_1$ electrode (41) and $X_2$ electrode (42). Y-coordinate of the incident light point (47) is obtained by the difference or the ratio of the photocurrents between $Y_1$ electrode (43) and $Y_2$ electrode (44).

Figure 8:
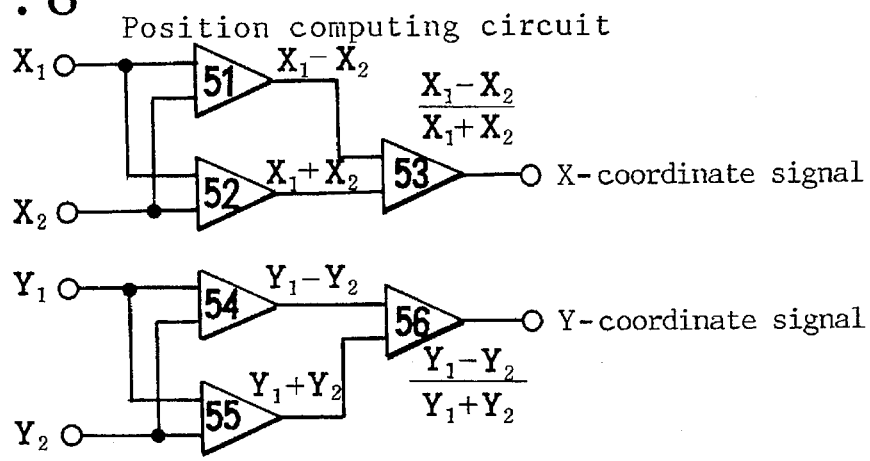
FIG. 8 is an operation circuit for computing X and Y coordinates of an incident light point by obtaining a difference $(X_1-X_2)$ and a sum $(X_1+X_2)$ of photocurrent signals from four electrodes.

FIG. 8 shows an example of a position computing circuit. The photocurrents from four electrodes (41) to (44) are inputs. A subtracter (51) calculates the difference $(X_1-X_2)$ of the photocurrents between $X_1$ electrode and $X_2$ electrode, and an adder (52) calculates the sum $(X_1+X_2)$ of the photocurrents from $X_1$ electrode and $X_2$ electrode. Further, a ratio of $(X_1-X_2)/(X_1+X_2)$ is obtained by another circuit (53) where the difference of $(X_1-X_2)$ is divided by the sum of $(X_1+X_2)$ for determining the incident position independent of the amount of incident light.

Figure 9:
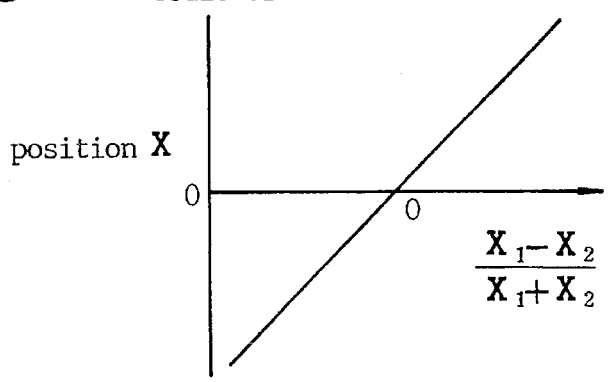
FIG. 9 is a graph showing the relationship between an X coordinate of input light and $(X_1-X_2)/(X_1+X_2)$.

FIG. 9 is a graph showing the relation between a ratio of $(X_1-X_2)/(X_1+X_2)$ and x coordinate of the incident light point. When the incident light point is equal to the origin, the ratio $(X_1-X_2)/(X_1+X_2)$ is zero. Therefore, x coordinate is in proportion to the ratio $(X_1-X_2)/(X_1+X_2)$.

Figure 5:
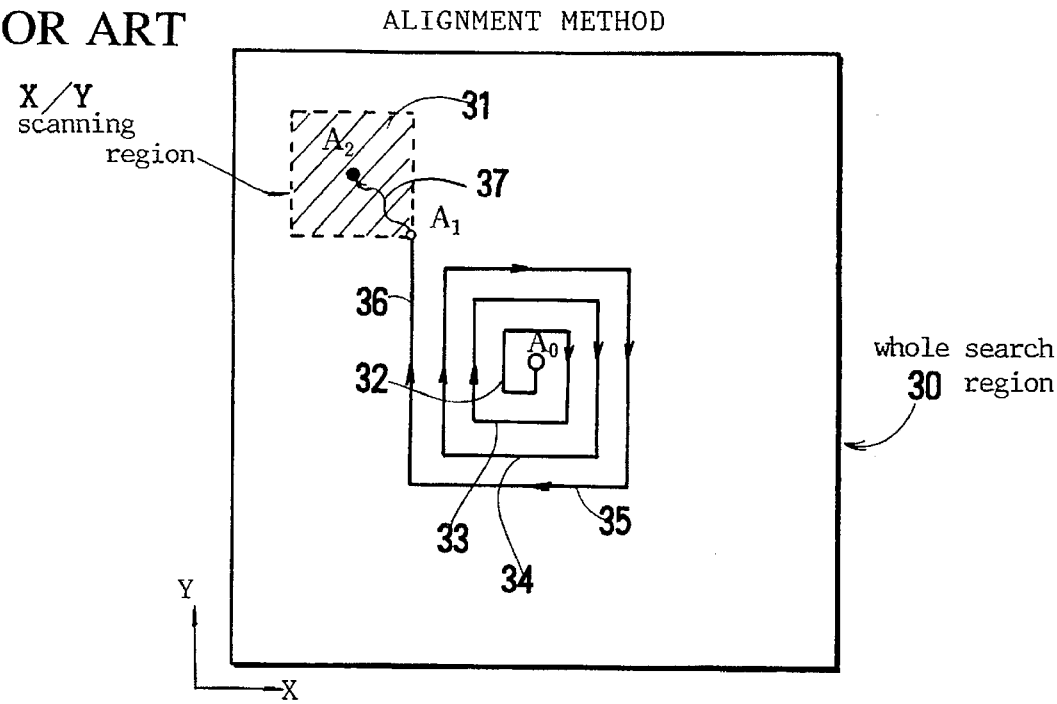
FIG. 5 is an explanatory figure for a conventional axis-alignment method wherein an end part of an optical fiber moves on helical routes and discovers weak light from a semiconductor laser, turns in the direction of increasing light power, goes ahead in a zigzag course, and finally finds out the most suitable coupling position.
Figure 6:
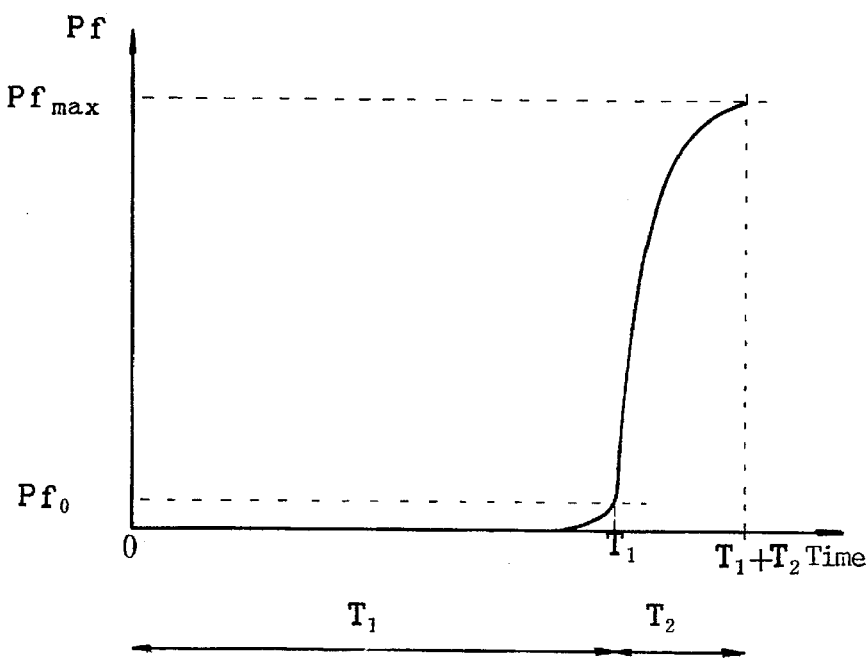
FIG. 6 is a graph showing the relation between the time expended and the incident light power entering an optical fiber before discovering the most suitable coupling position.

Y coordinate oil incident light point can be also obtained, because (x, y) coordinates of the incident light point are precisely obtained by measuring the photocurrents of four electrodes of (41) to (44). If there is a converging point in the light receiving surface, its position is able to be calculated. Hence, as long as the initial preset of a laser is suitable with respect to PSD, a precise converging point could be easily detected. Therefore, the wider the linear range between the photocurrents and the position coordinates becomes, the better the position sensitive device becomes. This invention proposes a novel position sensitive device having an InGaAs light receiving layer for infrared light. In this device, the linear range between the photocurrents and the position coordinates has a diameter of 2 mm. In FIG. 5, the whole searching region was defined to be 500 μm×500 μm. Therefore, it is possible to preset initially an end part of the optical fiber within the similar range of the searching region by some machinery setting. If there is a big position sensitive device (PSD) having a light receiving surface wider than 500 μm×500 μm, the PSD can receive the light from the semiconductor laser, and then can obtain the coordinates of a converging point on the light receiving region. An ordinary Si position sensitive device is allowable for visible light photodiodes, but can not be utilized for infrared light photodiodes because of no sensitivity. A position sensitive device for infrared light has never been in existence yet.

The present invention provides an absolutely new position sensitive device sensitive to 1.3 μm light, 1.55 μm, 1.48 μm and so on that are near infrared light. Ge photodiodes and InGaAs photodiodes are well known as photodiodes for infrared light. Generally, a position sensitive device needs a far wider light receiving surface than a photodiode. Ge (germanium) is likely to be a suitable material from this point of view, but Ge induces a large amount of dark current that is mostly fluctuated by temperature. As mentioned above, the (x, y) coordinates of incident light point are reckoned from the ratios of the differences of the photocurrents flowing to pairing electrodes to the sums of the photocurrents flowing to pairing electrodes. Since the differences of photocurrents are divided by the sums of photocurrents, it seems that the influence of dark current would be excluded. But it is not true. The dark current would be surely eliminated from the difference $(X_1-X_2)$, but would be included in the sum $(X_1+X_2)$, even if identical dark currents flow in the pairing electrodes. This fact results in the occurrence of errors in sensing incident light position, because the dark currents decrease the absolute value of $(X_1-X_2)/(X_1+X_2)$. To eliminate the influence of dark currents, the temperature of the device must be rigorously controlled. It would be possible to control the temperature by combining a Peltier device with a thermocouple. It is, however more desirable to make a device enjoying a small fluctuation by temperature.

In the case of an InGaAs photodiode, the dark current is so small, and the fluctuation by temperature is little. However, it was infeasible to produce a wide InGaAs photodiode because of the difficulty of making uniform binary or ternary compound semiconductors. Recent technology succeeded in producing an InGaAs photodiode having a large light receiving region with a 3 mm diameter with great difficulty. Of course, this InGaAs device is only a simple photodiode.

The Inventors of the present invention farther succeeded in producing an InGaAs position sensitive device which must be useful for making use of the optical axis-alignment to the near infrared light.

Figure 13:
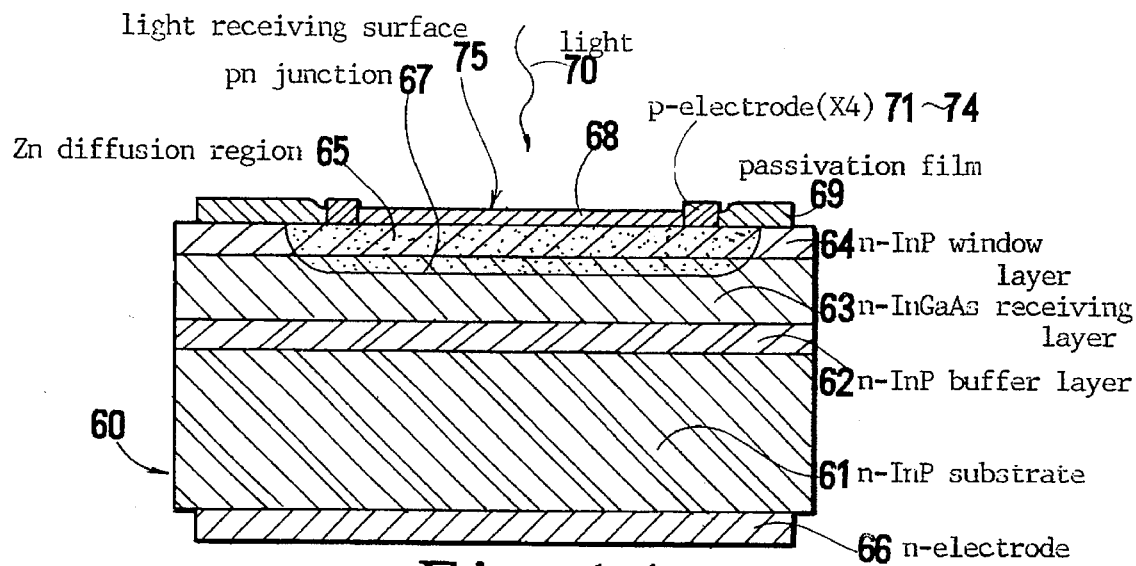
FIG. 13 is a sectional view of an InGaAs position sensitive device that is produced and is used in the present invention for the first time.
Figure 14:
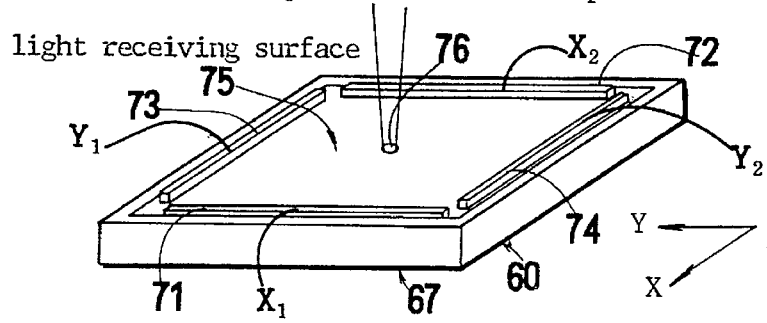
FIG. 14 is a perspective view showing the disposition of four electrodes formed on four sides of light receiving surface.
Figure 15:
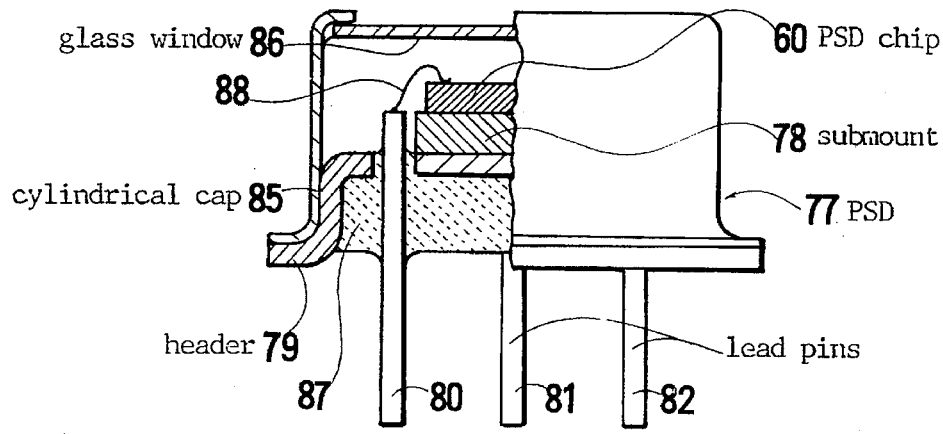
FIG. 15 is a partial vertically sectioned view of a position sensitive device mounted in a package.

FIG. 13, FIG. 14 and FIG. 15 are figures for explaining the new InGaAs position sensitive device proposed as one of the embodiments of this invention. FIG. 13 is a vertically sectional view of the PSD chip, FIG. 14 is a perspective view of an array of electrodes positioned on the top surface of the PSD chip and, FIG. 15 is a vertically sectional view of a PSD device mounting the PSD chip in a package. A method of producing the PSD chip (60) will be explained in accordance with FIG. 13.

An n-InGaAs buffer layer (62) with a 2 μm thickness is grown on an n-type InP wafer substrate (61) by an epitaxial growth method. Further, an n-InGaAs light receiving layer (63) with a 4 μm thickness is grown on the n-InP buffer layer (62). Furthermore, an n-InP window layer (64) with a 2 μm thickness is formed on the n-InGaAs light receiving layer (63). The circumferences of units are covered with a mask. Zinc (Zn) is thermally diffused from an upper surface into the wafer. Since zinc (Zn) is a p-type impurity, Zn-diffusion makes a p-type region (Zn diffusion region (65)) till the middle depth of the n-InGaAs receiving layer (63). The thermal diffusion region expands from the central part of the InP window layer (64) to the middle depth of the InGaAs light receiving layer (63). Four independent p-electrodes (71) to (74) are formed on the p-region (65). The reverse surface of the n-InP substrate (61) is in an ohmic contact with an n-electrode (66). The n-electrode (66) is made of an AuGeNi type alloy. The border between the Zn diffusion region and the n-InGaAs light receiving layer becomes a pn-junction (67). An antireflection film (68) is formed in the center part of the top surface of the unit. This film (68) made of SiON works as an antireflection film for the light of a 1.3 μm wavelength. A passivation layer (69) is formed on the parts of the top surface surrounding the p-electrodes. The pn-junction is protected by covering it with the passivation layer (69), for example, a SiN layer.

The n-type InP buffer layer (62) prevents the defects of the InP substrate from pervading to the light receiving layer (63). Owing to the InP buffer layer (62), the light receiving layer (63) enjoying few defects can be produced. The InP window layer (64) prevents a leakage current (dark current) from flowing through the pn-junction. Depressing the dark current ensures the measurement stable to the fluctuation of temperature. It is possible to function as a photodiode, even if there are no InP buffer layer (63) and no window layer (64). These layers can be surely excluded from a PSD. Therefore, a PSD without a buffer layer and a window layer can be produced. If the dark current can be depressed by another means, reliable measurement is carried out by minimizing the influence of noises. The chip is shaped like a square, and four long and slender p-type electrodes (71), (72), (73) and (74) are formed in ohmic contact with the p-type region. The p-type electrodes are AuZn type electrodes. The materials for the p-type electrodes are well known. A light receiving surface (75) is surrounded by four p-type electrodes. Infrared light (70) enters the light receiving surface (75). In this embodiment, the light receiving surface (75) is a 3.5 mm square. X coordinate of the incident light point is calculated by the current ratio or the current difference of $X_1$ electrode (71) to $X_2$ electrode (72) stretching in y-direction. Y coordinate of the same incident light point (76) is also reckoned from the currents of $Y_1$ electrode (73) and $Y_2$ electrode (74). The (x, y) coordinates of the incident light point can be calculated with high accuracy by relative ratios of photocurrents, which is similar to the Si position sensitive device explained in FIG. 7. The above mentioned processes are for one chip, but in the actual manufacturing, a lot of effective position sensitive device chips are simultaneously produced from a wafer. Chips are made by cutting a wafer unit by unit.

FIG. 15 shows a position sensitive device (PSD) (77) that is made by mounting the position sensitive device chip (60) into a package. A submount (78) made of alumina ($Al_2O_3$) is fixed en an upper surface of a header (79) by an AuSn solder. All of six surfaces of the submount (78) have been metallized. The header (79) is a FeNi type package. This is a TO-5 type 5 pin package having five lead pins (80), (81), (82), (83) and (84) extending downward. An insulator (87) insulates the lead pins from the case, and supports them to the case. The PSD chip (60) is positioned on the submount (78) by an SnPb solder. The four detecting electrodes (p-electrodes) (71) to (74) are connected to the lead pins respectively with Au wires (88) having a diameter of 25 μm. A ground electrode (66) (n-electrode) is connected to a ground pin through the metallized submount. After the mounting has been finished, a cylindrical cap (85) having a glass window (86) at the center is coupled to the header (79) by electric welding in a nitrogen atmosphere. The inner part of the cap (85) is sealed airtightly. It is possible to produce an InGaAs position sensitive device (77) having a large light receiving area of a 3.5 mm square. Properties of the InGaAs position sensitive device (77) are measured. When the applied voltage is 5 V, the sensitivity is more than 0.9 A/W, and the dark current is less than 100 nA. These results confirm the PSD (77) is excellent in the properties. The resolution of the InGaAs position sensitive device is ±20 μm to ±30 μm at the center region of a 2 mm diameter. The PSD his been explained in detail so far.

In the axis-alignment of optical devices, e.g. a semiconductor laser and an optical fiber, the present invention determines a beam position in a moment at the beginning by the position sensitive device, and moves an end part of the optical fiber to the beam position, whereby a part of light enters the optical fiber from a starting point. In a conventional position sensitive device, an end of the optical fiber began to move from non-light position, and sought for the light. This time consuming procedure is shortened by displacing the position sensitive device.

An outline of the optical axis-alignment device of the present invention will be explained according to FIG. 10.

The optical devices to be aligned are a semiconductor laser (16) and an optical fiber (9). A laser mount (90) supports a socket (91) on an upper surface, allowing the socket (91) to slide on the laser mount (90) freely in xy directions (horizontal direction). A semiconductor laser (16) is retained to the socket (91) by inserting pins into the socket (91). A laser driving electric power source (10) is connected to the laser mount (90) by a cord (93). The electric power source (10) supplies a driving current to the semiconductor laser (16), and makes the semiconductor laser (16) radiate. A sensor supporting plate (94) retains the position sensitive device (77) and an end of the optical fiber (9) side by side at the same height in the vicinity Of a focus point of the light from the semiconductor laser. The sensor supporting plate (94) is fixed to a moving-arm (96) by a cross joist (95). The moving-arm (96) is capable of moving in X, Y and Z directions freely by an XYZ driving system (14) which is controlled by a controller (12). Electric signals generated by the PSD (77) fixed to the sensor supporting plate (94) are sent to a position computing device (99), passing through a cord (98). Optical signals generated by the optical fiber (9) fixed to the sensor supporting plate (94) are divided into two light beams by a bisector (100). One light beam travels to a light power meter (11), passing through the optical fiber (101). The other light beam goes to a wavelength measuring instrument (103), passing through the optical fiber (102).

Figure 11:
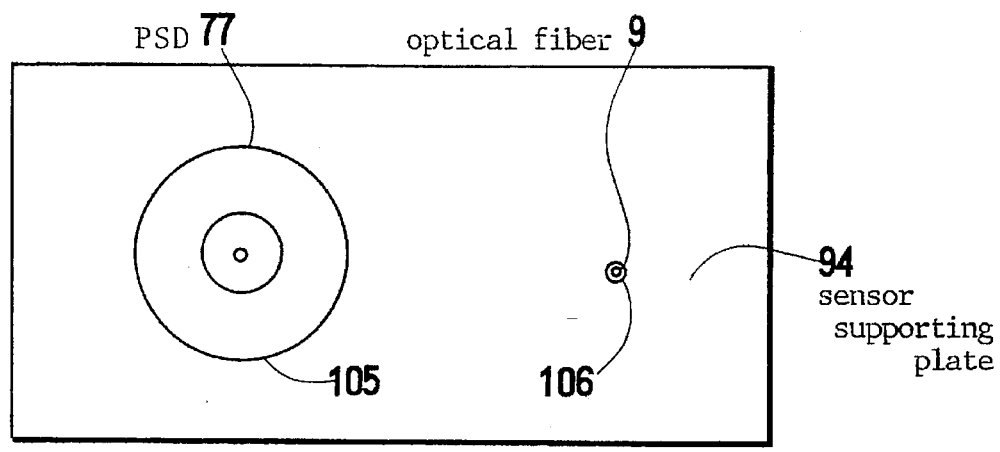
FIG. 11 is a bottom view of a sensor supporting plate for explaining the relative position among a position sensitive device, an optical fiber and the sensor supporting plate.
Figure 12:
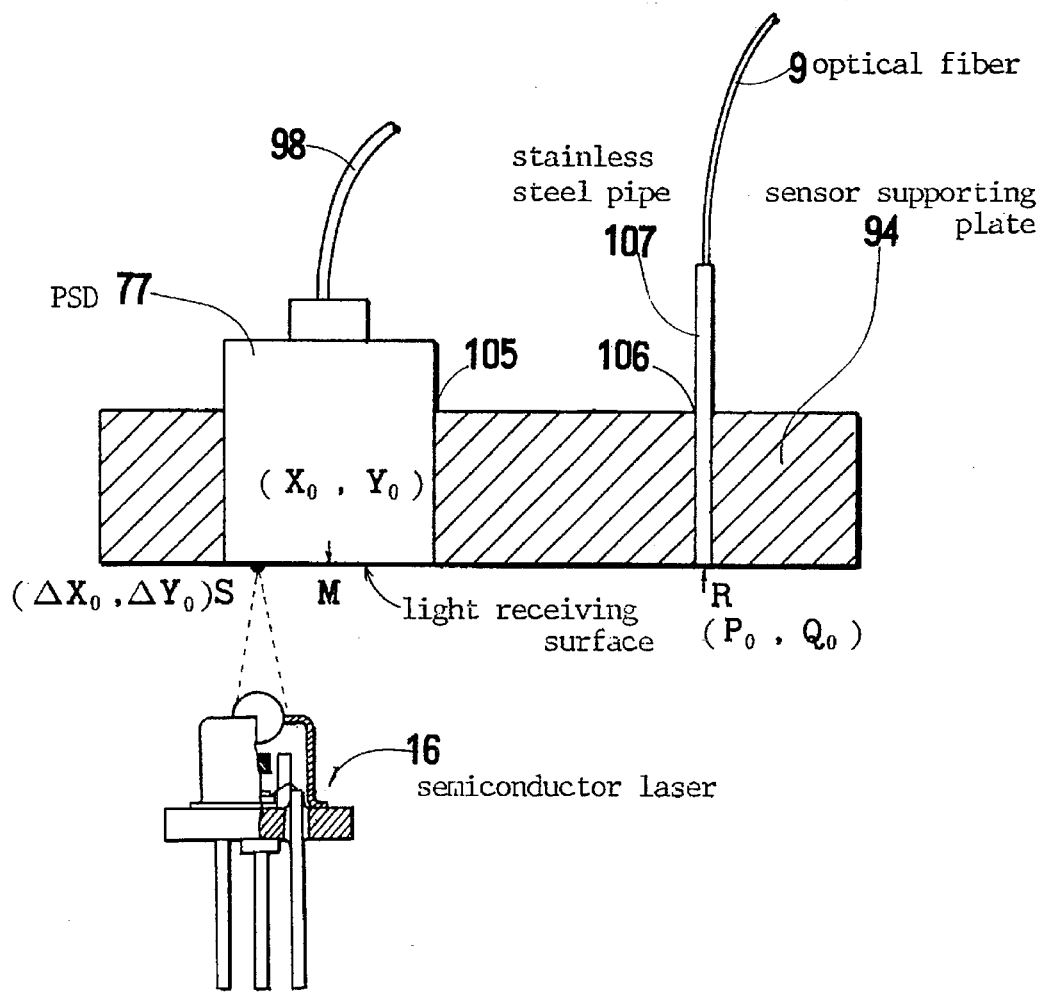
FIG. 12 is a longitudinal sectional view of the sensor supporting plate for explaining the relative position among the position sensitive device, the optical fiber, the sensor supporting plate and a semiconductor laser.

One of the most important compositions is that the position sensitive device (77) and the end (9) of the optical fiber are fixed side by side at the same height on the sensor supporting plate. An arrangement of the position sensitive device (77) and the optical fiber (9) will be explained in detail according to FIG. 11 and FIG. 12. FIG. 11 is a bottom view of the sensor supporting plate (94). In FIG. 11, there is a large hole (105) on the left. The PSD (77) is inserted into the hole (105). A small hole is formed on the right, and a stainless pipe (106) holding the end (9) of the optical fiber is inserted therein. In this example, the single-mode optical fiber has a core of a 10 μm diameter. The outer diameter of the PSD is 10 mm. The light receiving square is a 3.5 mm square, and has a linearity in the range of a 2 mm diameter. The sensor supporting plate (94) is made of stainless, and is 30 mm×20 mm in area. The distance between the center of the PSD (77) and the center of the optical fiber is 15 mm. As mentioned above, the light receiving surface of the position sensitive device (77) and the end of the optical fiber are arranged to be at the same height. It is assumed that the center(M) of the light receiving surface is away at a distance (L) in X-direction from the center (R) of the optical fiber end. Y coordinates of (M) and (R) are assumed to be equal. In this case, it is possible to move the center (R) of the optical fiber end to the position where the center (M) of the light receiving surface has occupied just before by moving the sensor supporting plate by the distance (L) in X-direction by the XYZ driving system. The sensor supporting plate (94) is preset to stop at a standard position at the beginning of measurement. When the sensor supporting plate (94) stays at the standard position, the light from the semiconductor laser is strictly planned to enter the region having a 2 mm diameter where the PSD (77) displays a high resolving power. Further, the position of a focus point on the light receiving surface of the PSD (77) is calculated, and the end of the optical fiber is moved to the focus point position. A practical procedure with regard to this axis-alignment will be explained in detail.

When the sensitive supporting plate (94) is preset at the standard position with respect to three-dimensional coordinates defined to the XYZ driving system, two dimensional coordinates of the center (M) of the light receiving surface are represented by $(X_0, Y_0)$, and two dimensional coordinates of the center (R) of the optical fiber are represented by $(P_0, Q_0)$. The semiconductor laser radiates light at the standard position. (S) is a focus point of the light receiving surface. It is assumed that the coordinates of S are $(\Delta X_0, \Delta Y_0)$ in the two dimensional coordinates on the light receiving surface having the origin of (M). As mentioned before, relative gaps $\Delta X_0$ and $\Delta Y_0$ of the focus point are obtained from the current values of four electrodes of the PSD with a considerable degree of accuracy. A vector of the difference between the focus point S and the center (R) of the optical fiber is represented by $(X_0+\Delta X_0-P_0, Y_0+\Delta Y_0-Q_0)$. The controller (12) can calculate this difference vector, and can give the XYZ driving system such a signal that the sensor supporting plate (94) is moved by the difference vector. The XYZ driving system makes the sensor supporting plate (94) move by the vector value in a moment. As a result, the focus point (S) on the light receiving surface nearly coincides with the center (R) of the optical fiber end. Through these procedures, the optical fiber end is guided to the scanning region (31) shown in FIG. 5 at a stroke. The light having a certain degree of power enters the optical fiber. The rough axis-alignment has finished. After that, the optical fiber is further minutely moved by the controller as searching for a direction where light power becomes higher successively. At last, the optical fiber is capable of finding out the most suitable point $A_2$ where light power is the largest. The most suitable point on XY plane can be discovered thereby. Furthermore, the optical fiber can find out the most suitable point in Z direction by moving the sensor supporting plate up and down. Method of the fine axis-alignment is similar to the conventional one.

Someone may suppose that S=R is likely to be established by only the PSD axis-alignment. But it is not true, because there exist errors, for example, a detection error of the position sensitive device, and a feed error of the sensor supporting plate caused by the inertia of the XYZ driving system. These errors are, however, smaller than the size of the scanning region. Therefore, it is always possible to move the optical fiber end (R) into the scanning region for practicing the fine axis-alignment.

In this example, the position sensitive device and the optical fiber are movable, and the semiconductor laser is at rest. Conversely, it is allowable that the semiconductor laser are movable, and the position sensitive device and the optical fiber are at rest. Hence, there is no problem in this matter as long as the relative movement of the laser can be performed to the position sensitive device and optical fiber.

Figure 1:
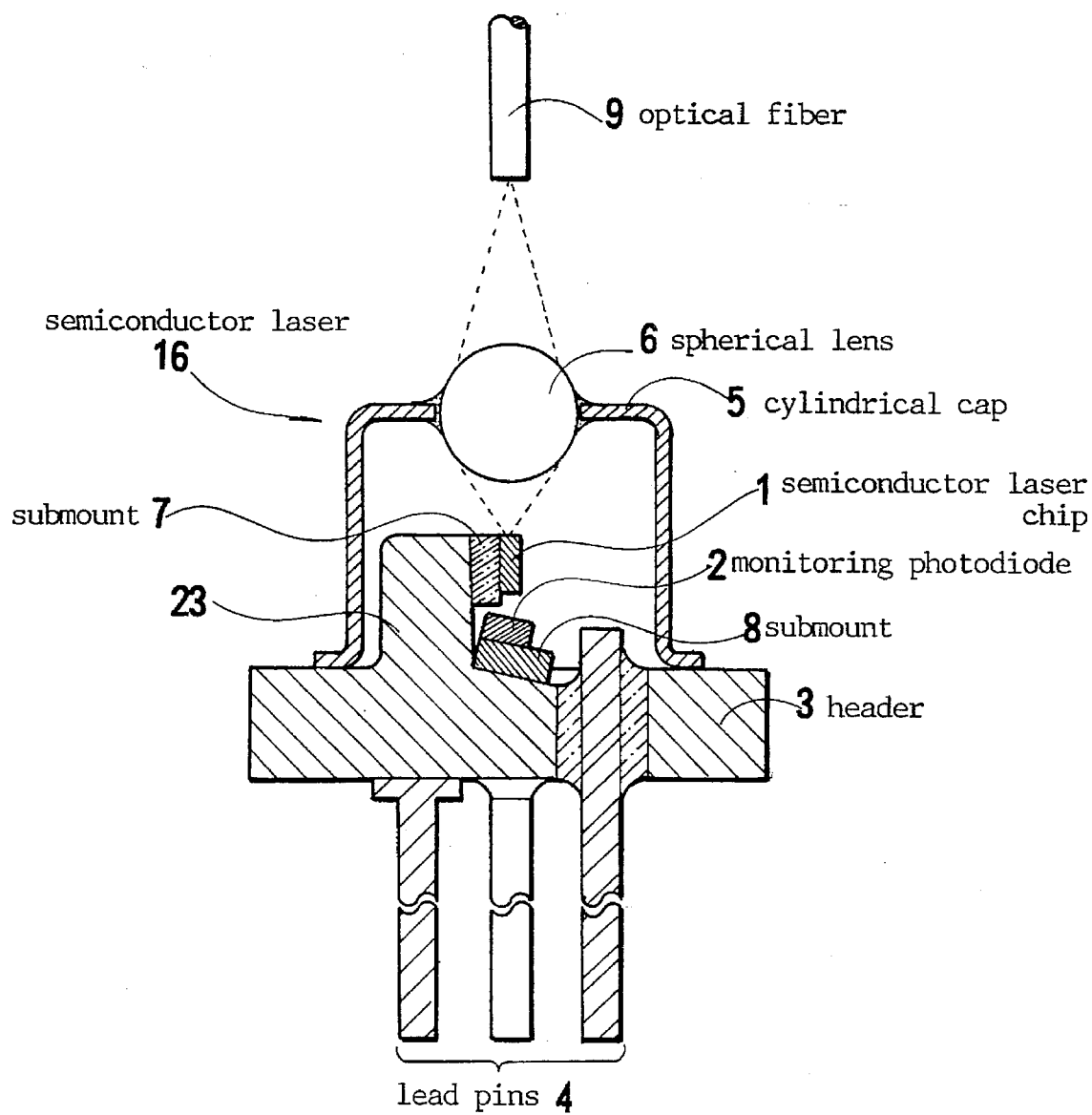
FIG. 1 is a sectional view showing the relation between a semiconductor laser and an optical fiber.
Figure 2:
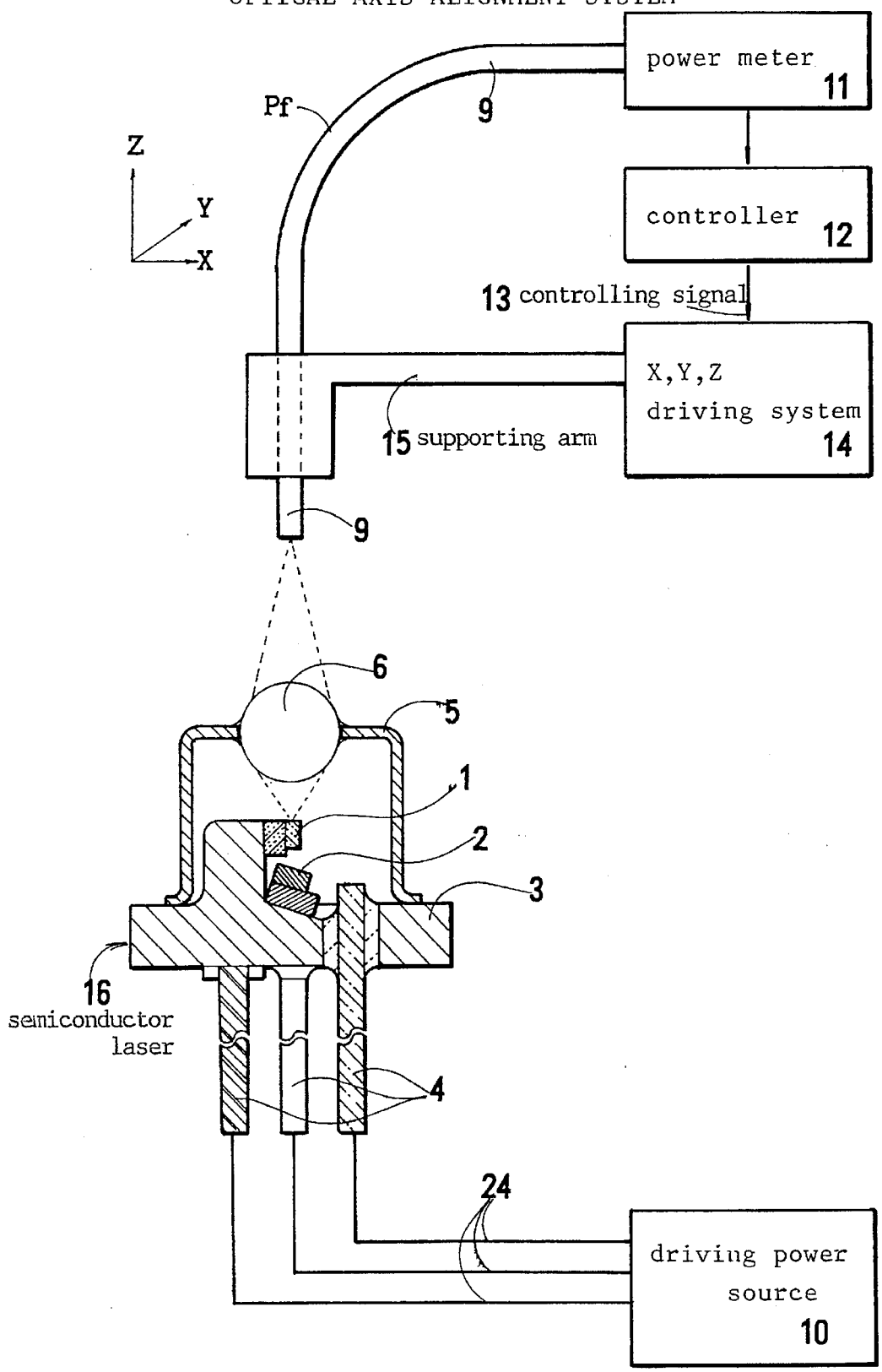
FIG. 2 is a schematic structural view demonstrating a conventional optical axis-alignment method.
Figure 3:
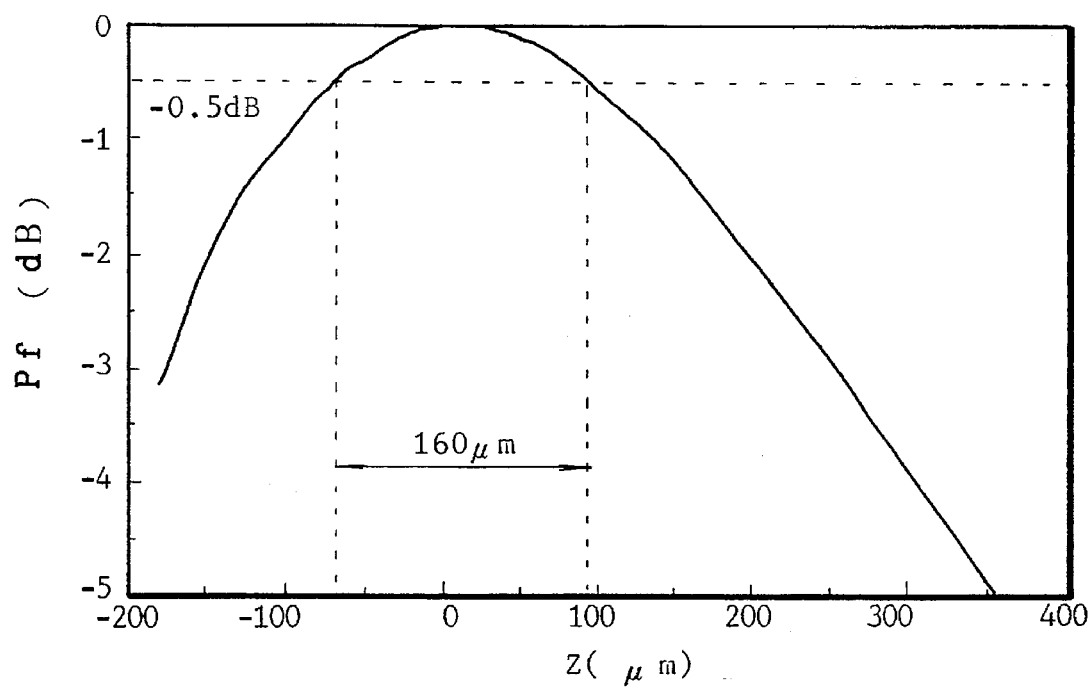
FIG. 3 is a graph showing the relation between a deviation in Z-direction from the most suitable coupling position and an incident light power into an optical fiber in the coupling of a semiconductor laser with an optical fiber, where the abscissa indicates a distance (μm) from the most suitable coupling position, and the ordinate indicates an attenuation (dB) of light power from the maximum light power at the most suitable coupling position.
Figure 4:
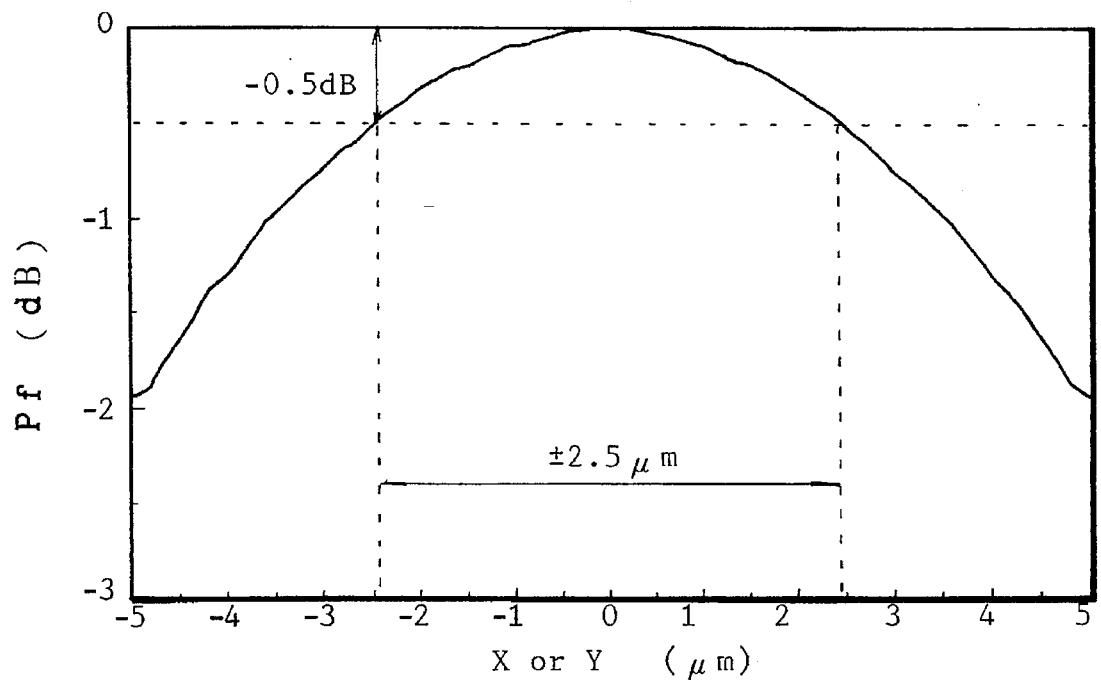
FIG. 4 is a graph showing the relation between a deviation in X and Y directions (XY plane) from the most suitable coupling position and the incident light power into an optical fiber in the coupling of the semiconductor laser with the optical fiber, where the abscissa indicates a distance (μm) from the most suitable coupling position, and the ordinate indicates an attenuation (dB) of light power from the maximum light power at the most suitable coupling position.

When the conventional method shown by FIG. 2 is used, it takes 1.5 minutes from the beginning to the ending to align a semiconductor laser with an optical fiber. In the method of the present invention, the axis-alignment spends 40 seconds. Such a short axis-alignment time is based on one of the advantages of the present invention, that is, a focus point of the semiconductor laser is quickly discovered by the position sensitive device. Hence, it is feasible to cut down almost all time expended for the rough-alignment. As a result, this invention takes only less than a half of the time expended for the prior axis-alignment. This is not all this invention has brought about. The present invention can find out and exclude defective semiconductor lasers in a moment. This is another merit of this invention. There exist some malfunctioned semiconductor lasers included in the semiconductor laser products. Here, the defective semiconductor lasers mean non-luminous or poorly luminous semiconductor lasers, when the conventional method is used, searching procedure starts from the state of non-light, so that it is impossible to judge from the fact that light does not enter the optical fiber whether the semiconductor laser is broken or the optical fiber is still away from the place where the laser light exists. Therefore, it results in expending a long time to judge whether the semiconductor laser does work or not. In the present invention, since the light from the semiconductor laser is detected by the position sensitive device having a large light receiving surface, troubles of the semiconductor laser of itself can be found out in a moment. Further, this invention can discover malfunctioned semiconductor lasers having an optical power of less than a predetermined light power at once. All defective semiconductor lasers are completely excluded beforehand, and the axis-alignment procedures are not practiced for them. Consequently, the time necessary for the axis-alignment procedures is eliminated. Only the semiconductor lasers, which are judged to be good, experience the axis-alignment procedures. In the apparatus shown in FIG. 10, an emission wavelength of light is measured besides the axis-alignment. A part of the light from the semiconductor laser is guided into the emission wavelength measuring device (103) by the bisector (100), and the inspection of wavelength is carried out.

Figure 10:
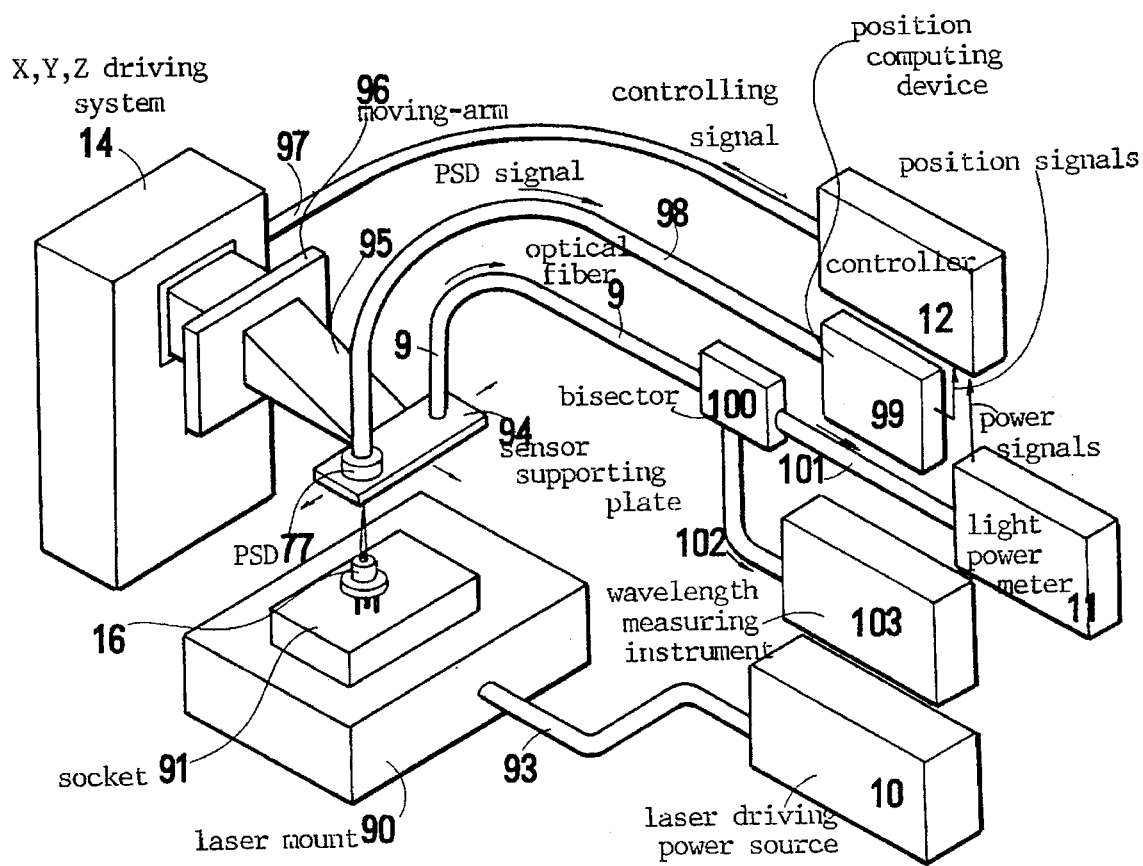
FIG. 10 is a schematic structural view showing the principle of the axis-alignment method of the present invention.

The axis-alignment apparatus and the axis-alignment method of the present invention have been explained by referring to FIG. 10. Objects of the axis-alignment are light emitting devices, e.g. semiconductor lasers and so on, and optical transmission lines, e.g. optical fibers, optical waveguides and so on. Further, the axis-alignment is allowable for connecting two types of optical transmission lines, for example, an optical fiber and an optical waveguide. In this case, a light emitting device must be connected to the optical transmission lines for introducing the light from the light emitting device to any one of the light transmission lines. One semiconductor laser or a plurality of semiconductor lasers are available. Here, the two devices to be aligned relatively are called a first optical device and a second optical device. In FIG. 10, the first optical device is a semiconductor laser, and the second optical device is an optical fiber. FIG. 10 shows only the functions necessary for the axis-alignment briefly, and only the procedures necessary for the axis-alignment have been described. But the axis-alignment is not the last purpose of itself. The final object exists at some other place. One object is to produce optical devices or modules including the first optical device and the second optical device which are coupled with high efficiency. In this case, after the axis-alignment has been finished, the relation of positions therebetween is fixed. Another object of the axis-alignment is for the inspection of the first optical device, that is, the light power and wavelength of the first emissive optical device are inspected by installing a light power meter, a spectroscope and so on, in the end part of the second optical device. After the inspection, the first optical device is separated from the second optical device. Several embodiments of the axis-alignment, for example, the inspection of semiconductor laser, the production of module in which the semiconductor laser is coupled with the optical fiber, and the coupling of a plurality of optical fibers, will be explained as follows.

[Embodiment 1: Axis-alignment applied to the inspection of a semiconductor laser]

Embody 1 employs the composition shown by FIG. 10 as it is. An object semiconductor laser (16) is inserted into the socket (91), and a driving current is supplied by the laser driving electric power source (10). The position sensitive device (77) is positioned just above the semiconductor laser (16). ($P_0$, $Q_0$) is the coordinates of the end of the optical fiber with respect to a static coordinate system. ($X_0$, $Y_0$) is the coordinates of the center of the position sensitive device to the static coordinate system. The socket (9) and the PSD (77) are arranged to guide the laser light into the region of an effective light receiving diameter of the PSD (77). The position sensitive device (PSD) senses the light from the semiconductor laser, and obtains the coordinates ($\Delta X_0$, $\Delta Y_0$) of the center of beams on the light receiving surface from the photocurrents flowing into the four electrodes. The sensor supporting plate (94) is moved by ($X_0+\Delta X_0-P_0$, $Y_0+\Delta Y_0-Q_0$). Some degree of light certainly enters a narrow core of the optical fiber, and is inspected by the light power meter. Moreover, the sensor supporting plate (94) is finely displaced in X and Y directions which allow the maximum amount of light to enter the core of the optical fiber. Further, the sensor supporting plate (94) is moved in Z direction for seeking the maximum power point. Finally, the sensor supporting plate (94) locates the point where the incoming light becomes maximum. Only about 40 seconds are required for this axis-alignment procedure. The optical fiber is fixed at the optimum point of the maximum light power three-dimensionally. Properties of the semiconductor laser, e.g. output power, wavelength, and so on, are investigated. This is an example of the applications of the present invention as an inspection device.

[Embodiment 2: Axis-alignment applied to the aligning of a semiconductor laser module with an optical fiber]

Figure 16:
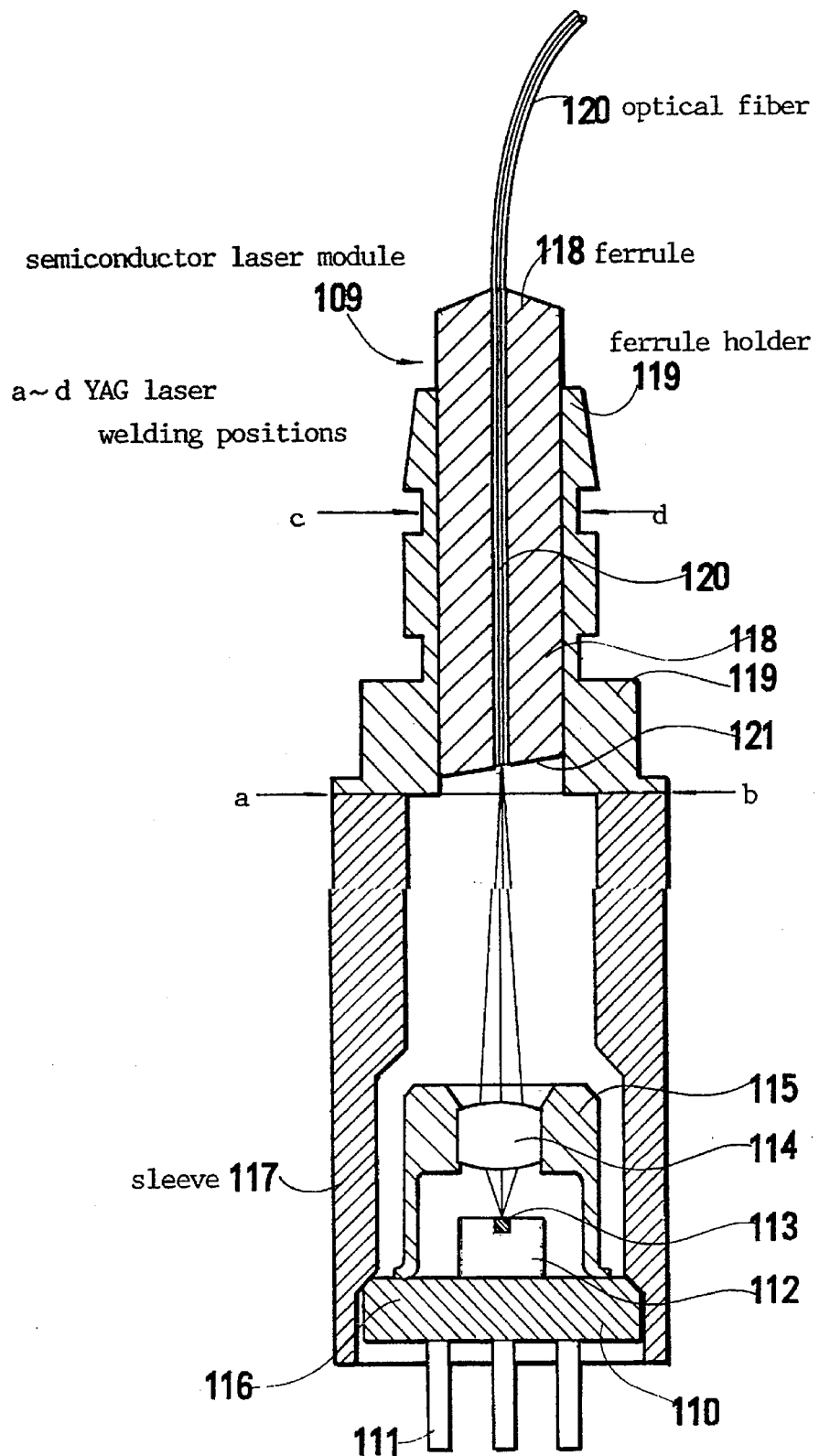
FIG. 16 is a vertically sectional view showing an example of the semiconductor laser module coupling a semiconductor laser with an optical fiber.

The present invention is surely utilized for mounting processes for producing devices. FIG. 16 is a header (110) shaped semiconductor laser module (109). A header (110) shaped like a disc has several pins (111). A protrusion (112) is formed on an upper surface of the header (110). A semiconductor chip (113) is fixed on an upper end of the protrusion of the header (110) with a light emitting region in parallel with the axial direction of the header (110). A monitor photodiode is not shown in FIG. 16, but is installed on the surface of the header (110). A cap (115) equipped with a lens (114) as a window is fixed to the front surface of the header (110). The semiconductor laser chip (113) is sealed in vacuum by the cap (115). The center of the lens (114) is aligned with the center of the laser by another means, and the cap (115) is fixed to the header (110). A cylindrical sleeve (117) is fixed to the header (110) by electric welding as surrounding the cap (115). The header (110), the cap (115) and the sleeve (117) are unified in a body. A tip part of an optical fiber (120) is fixed to a center hole of a ferrule (118). A bottom surface (121) of the ferrule (118) and the tip of the optical fiber are slantingly polished for preventing return-light from entering the semiconductor laser. The ferrule (118) is inserted into a ferrule holder (119). The ferrule (118) is not fixed thereto. The ferrule (118) can relatively move in Z direction in the ferrule holder (119). A bottom surface of the ferrule (118) is not fixed to an upper surface of the sleeve (117). The bottom surface of the ferrule (118) and the upper surface of the sleeve (117) are positioned face to face with each other. Here, the axis-alignment is to search the most suitable position in XY plane by arranging the attachment between the ferrule holder bottom surface and the sleeve upper surface. Welding positions are four points of (a), (b), (c) and (d) in FIG. 16.

Figure 17:
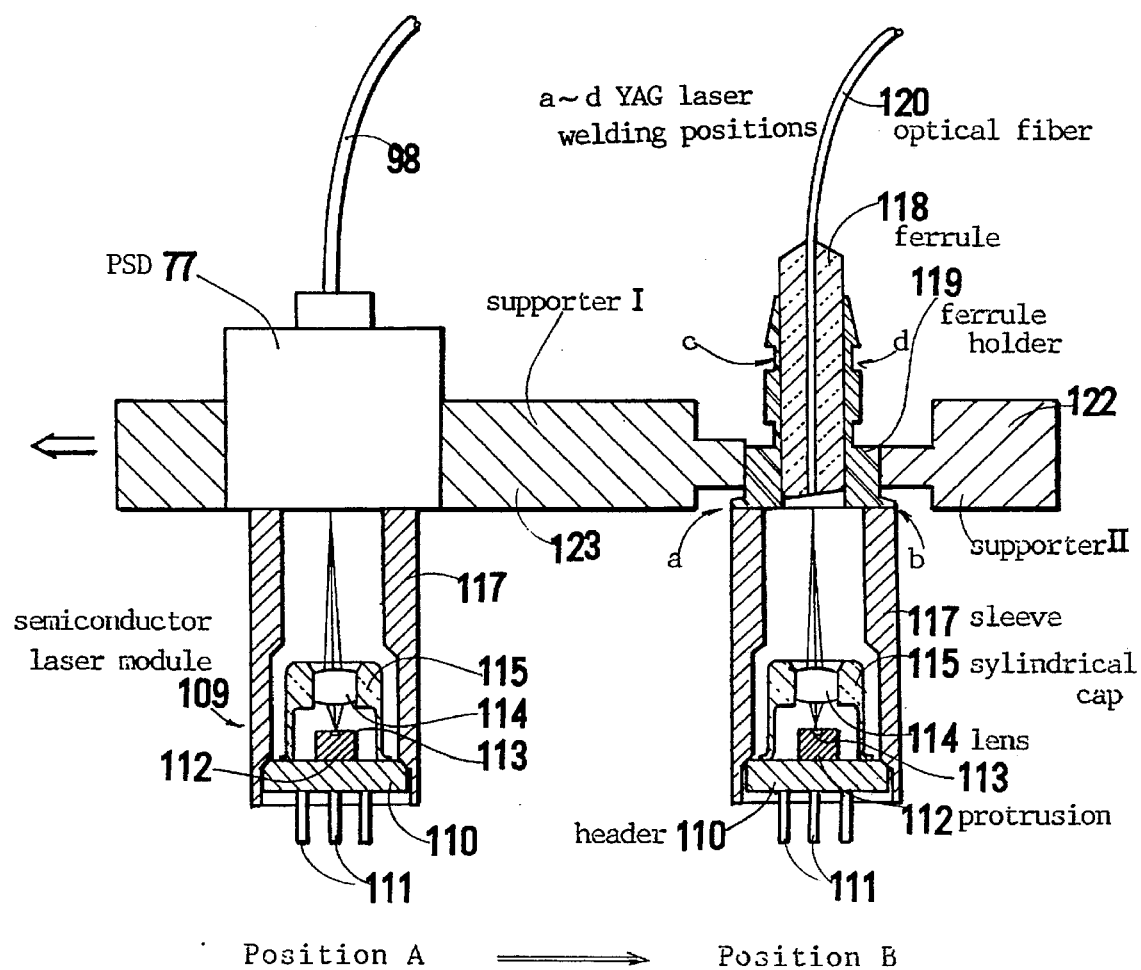
FIG. 17 is a sectional view of a laser module showing the relation among a semiconductor laser, an optical fiber and a position sensitive device in the case of applying the present invention to the mount of the semiconductor laser module.

The structure of a sensor supporting body will be explained according to FIG. 17. In mounting processes, the sleeve (117) is fixed by a certain means that is not shown in FIG. 17. The ferrule holder (119) is sandwiched by supporters (122) and (123) and are sustained thereto. The position sensitive device (77) is fixed to the supporter (123). Since the sleeve (117) is supported by the supporters (122) and (123), the relative position between the position sensor device (77) and the ferrule holder (119) is determined. Firstly, the position sensor device (PSD)(77) is placed just above the semiconductor laser module (109) at position (A). In this station, a current is supplied to the semiconductor laser, whereby the semiconductor laser emits light. A focus point of the light is searched by the position sensor device. In the next stage, the supporters (122) and (123) are moved for aligning the tip of the optical fiber with the focus point. This is point (B). The displacement is ($X_0+\Delta X_0-P_0$, $Y_0+\Delta Y_0-Q_0$). In FIG. 17, two semiconductor laser modules (109) are shown, but actually the semiconductor laser module is only one and is fixed. The supporters (122) and (123) are movable. Two semiconductor lasers are shown in order to indicate the situations of before and after the movement. Position (A) is the state before the movement of the supporters, where the semiconductor laser is opposite to the position sensor device (77). Position (B) is the state after the movement of the supporters where, the semiconductor laser is opposite to the optical fiber, and the position sensor device (77) is deviated to left. The supporters are finely moved at position (B) in order to search the maximum point of light power. This means the most suitable point. Since the most suitable position in XY plane has been found, the ferrule (118) is relatively moved up and down to the ferrule holder (119). As a result, the maximum point of light in Z direction is sought. After that, the ferrule holder (119) is fixed to the sleeve (117) by welding points (a) and (b). Further, the ferrule (118) is fixed to the ferrule holder (119) by welding points (c) and (d). The laser module (109), the ferrule (118) and the ferrule holder (119) can be unified in a body. This is an example of the present invention applicable to the mounting of the semiconductor laser. In the above method, the supporters (122) and (123) are moved to the left, but alternatively it is allowable that the supporters (122) and (123) are at rest, and the body supporting the semiconductor laser module (109) is moved to right, which strictly corresponds with the location shown by FIG. 17. The displacement is ($-X_0-\Delta X_0+P_0$, $-Y_0-\Delta Y_0+Q_0$). It took three minutes to carry out the mounting procedures including the axis-alignment and the welding in the conventional method which moves the optical fiber helically for seeking for light from the starting place where no light exists. The present invention takes only one minutes to practice the mounting procedures of the same device. The time expended for the mounting procedures is shortened to about ⅓. This fact shows this invention is suitable for the axis-alignment.

The axis-alignment between the semiconductor laser and the optical fiber has been explained hitherto. This invention exhibits a great effect on the mounting in the combination of a semiconductor laser and an optical fiber. This invention has, however, other applications for the axis-alignment in various combinations. For example, this invention is utilized for coupling a semiconductor laser with an optical waveguide, and further is suitable for the coupling between an optical fiber leading laser light and the lens system of an optical waveguide.

[Embodiment 3: Axis-alignment applied to the coupling between an optical fiber and an optical waveguide]

Figure 18:
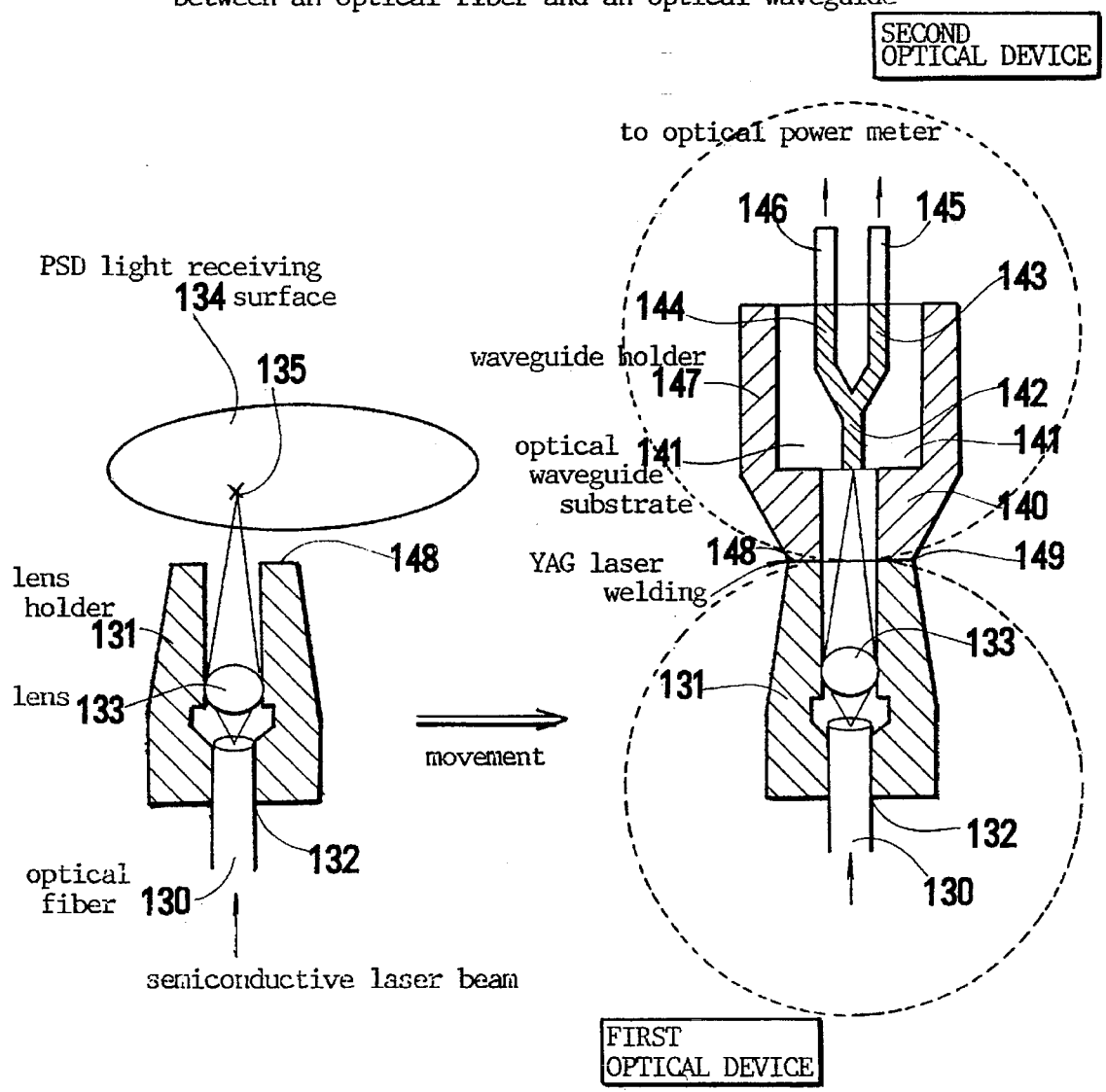
FIG. 18 is a sectional view for explaining the axis-alignment operation between an optical fiber and an optical waveguide.

The coupling between an optical fiber and an optical waveguide will be explained in accordance with FIG. 18. Light from a semiconductor laser is guided by the optical fiber, is got out of an end of the optical fiber, and is focused by a lens. After an optical axis of the optical waveguide is aligned with the optical fiber, the optical fiber and the optical waveguide are coupled with each other.

The light from the semiconductor laser is introduced into an end of an optical fiber (130). A lens holder (131) is placed at the other end of the optical fiber (130). The end part of the optical fiber (130) is inserted into an opening (132) perforated at the bottom of the lens holder (131). A lens (133) is fixed above the end of the optical fiber. The light propagating in the optical fiber (130) is got out of the end of the optical fiber, and is focused at a focus point (135) by the lens (133). According to the idea of this invention, a position sensitive device (PSD) (134) is placed opposite the optical fiber in order to sense the light from the optical fiber. The position sensitive device has four individual electrodes along four sides on its light receiving surface, but these electrodes are not shown in FIG. 18. The object to be coupled is a second optical device (140) including an optical waveguide. The optical device is made by forming optical waveguides (142), (143) and (144) having a higher refractive index on an optical waveguide substrate (141). Size of the waveguide is nearly equal to a core diameter of a single mode fiber. Therefore, a precise axis-alignment is crucial. In FIG. 18, a Y-branch is formed by three optical waveguides, so that there are two output optical fibers (145) and (146). A waveguide holder (147) supports the optical waveguide substrate (141). A light receiving surface (134) of the position sensitive device and the waveguide holder (147) are combined by a supporting stand (not shown) as a body. The supporting stand makes the PSD and the waveguide holder (147) move by an equal distance at the same time. The center of the light receiving surface is represented by $(X_0, Y_0)$, and the center of the optical waveguide (141) is represented by $(P_0, Q_0)$. The difference $(P_0-X_0, Q_0-Y_0)$ therebetween is constant. These relations are the same as the relations shown by FIG. 10 and FIG. 11. The position sensitive device (134) is opposite to the optical fiber, and the focus point (135) shown by $(\Delta X, \Delta Y)$ on the light receiving surface is searched. In the next stage, the entire body constructing the PSD (134) and the optical waveguide holder (147) is moved in parallel by $(X_0+\Delta X_0-P_0, Y_0+\Delta Y_0-Q_0)$. Reversely, it is allowable that the PSD (134) and the optical waveguide holder (147) are kept at a certain position, and the lens holder (131) is moved in parallel by $(-X_0-\Delta X_0+P_0, -Y_0-\Delta Y_0+Q_0)$. A part of light from the semiconductor laser is input into the optical waveguides. Either of the holder (131) or the holder (147) is finely moved for the axis-alignment as measuring the light power propagating through the optical fibers (145) arid (146). Contact surfaces (148) and (149) between the holder (131) and the holder (147) are fixed at a point where light power is the greatest by YAG laser welding. It is feasible to couple the optical waveguide with the most suitable coupling position.

[Embodiment 4: Axis-alignment applied to the coupling between a semiconductor laser array and an optical fiber array]

Figure 19:
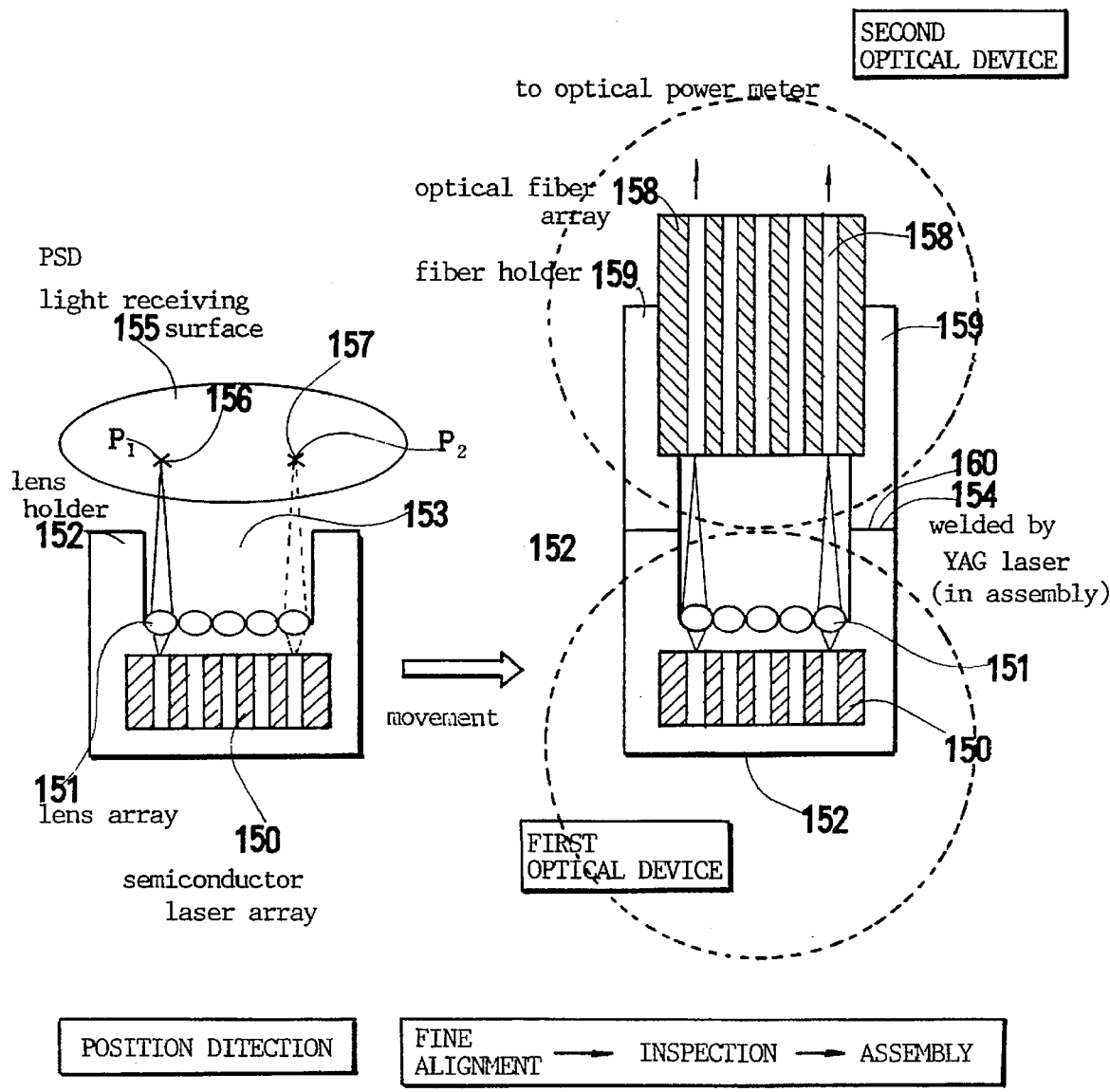
FIG. 19 is a sectional view for explaining the axis-alignment operation between a semiconductor array and an optical fiber array.

The coupling of two optical devices having a plurality of equivalent units will be explained according to FIG. 19. One optical device is a semiconductor laser array that is constructed by arranging a plurality of semiconductor lasers one-dimensionally or two-dimensionally, and installing a lens in front of each semiconductor laser. The other optical device is an optical fiber array that is constructed by arranging a plurality of optical fibers one-dimensionally or two-dimensionally. As shown in FIG. 19, a semiconductor laser array (150) is formed by lining up a plurality of semiconductor lasers in parallel with each other one-dimensionally (1×M) or two-dimensionally (N×M). The pitch therebetween is strictly regulated. As many lenses as the semiconductor lasers are lined up in front of the semiconductor lasers, and each lens focuses the light got out of each semiconductor laser. The pitch of lenses is surely equal to that of semiconductor laser. Every optical axis is in parallel. All focus points are arranged in line at equal intervals. Every distance between the focus point and the lens is, of course, arranged to be equal. The array (150) of the semiconductor array and an array (151) of the lenses are fixed to a lens holder (152). In the array of optical fibers to be coupled with (he laser array, all optical fibers are arranged in line at equal pitches one-dimensionally or two-dimensionally. The optical fiber array (158) is supported by a fiber holder (159). Both the fiber holder (159) and the position sensitive device are supported by a supporting stand in order to align and couple the laser array with the optical fiber array. Firstly, the light receiving surface (155) of the PSD is opposite to the semiconductor laser array. Only two semiconductor lasers positioned at both ends are excited. A focus point $P_1$ is formed on the PSD light receiving surface by the left end semiconductor laser. A focus point $P_2$ is formed on the PSD light receiving surface by the right end semiconductor laser. If both of the end semiconductor lasers were excited at the same time, the photocurrents induced by two lasers would be mixed, and coordinates of focus points would not be obtained. Therefore, the leftest laser and the rightest laser shall emit light at different times. The position sensitive device (PSD) is capable of calculating two dimensional coordinates of $P_1$ and $P_2$ thereby.

The position sensitive device and the optical fiber array are moved toward the laser array as a body for equalizing the core of the leftest optical fiber with the focus point $P_1$ of the leftest laser and for equalizing the core of the rightest optical fiber with the focus point $P_2$ of the rightest laser. Further, the leftest and rightest optical fibers are coupled with the counterpart semiconductor lasers at the most suitable coupling position by the fine axis-alignment. The most suitable coupling positions for the leftest and rightest optical fibers and lasers give the best coupling positions for other semiconductor lasers and optical fibers. This results from the fact that the pitch of semiconductor lasers is in correspondence with the pitch of optical fibers from the beginning.

In the case of inspecting the semiconductor lasers in the array, their properties are obtained by driving the lasers and measuring light power from the fibers by a light power meter without fixing the laser holder to the optical fiber holder. The wavelengths of the lasers are certainly measured. It is possible to establish the axis-alignment between the semiconductor laser array and the optical fiber array. When the lens array and the semiconductor laser array should be fixed as to make a module, an end surface (134) of the lens holder shall be welded with an end surface (160) of the fiber holder by a YAG laser.

[Embodiment 5: Axis-alignment applied to the coupling between an optical fiber array and an optical waveguide]

Figure 20:
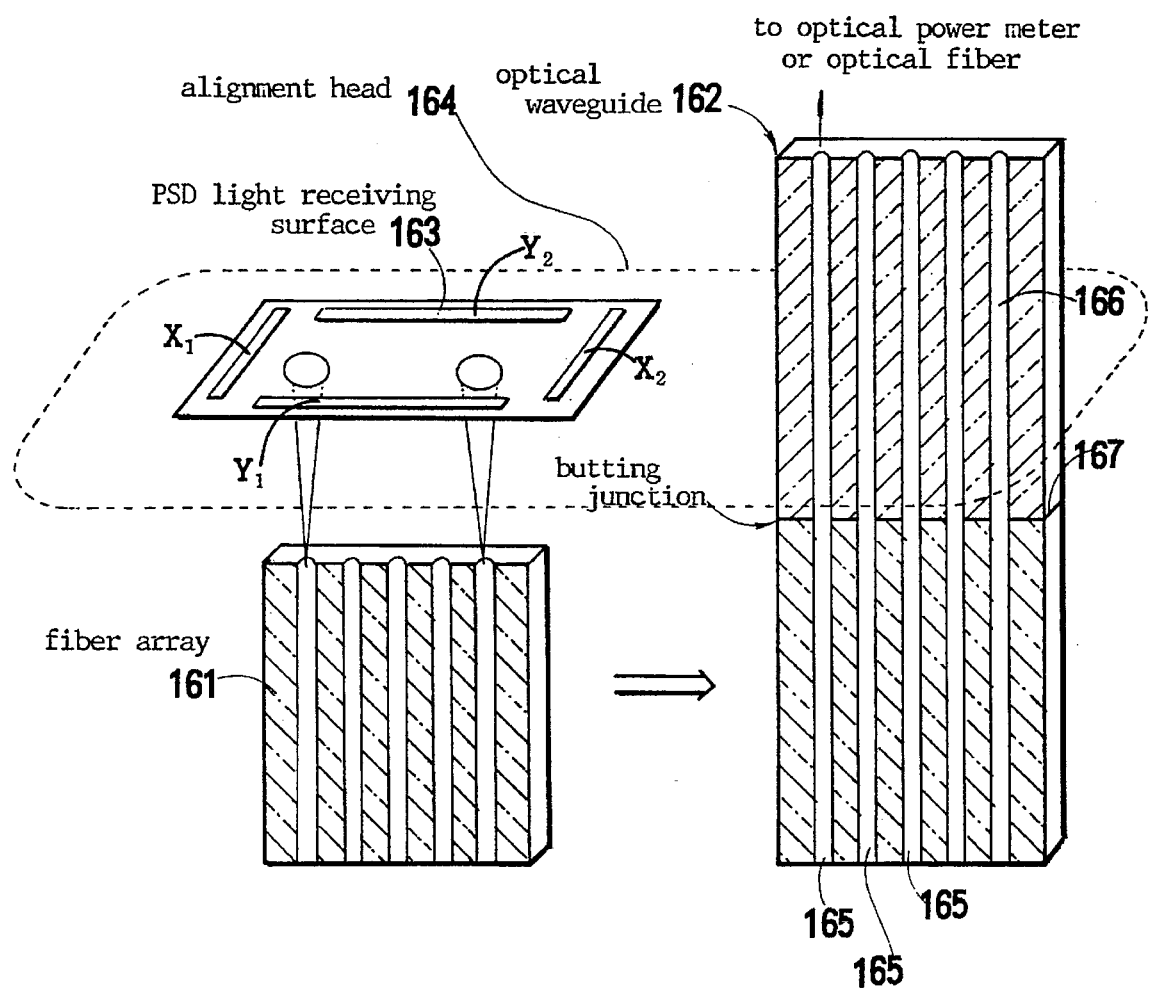
FIG. 20 is a a sectional view for explaining the axis-alignment operation between a semiconductor laser array and an optical waveguide.

The above-explained embodiments have converging optics, e.g. lenses, in the devices emitting light. The present invention is, however, effective for the devices having no converging optics, for example, a fiber array (161) is directly coupled with an optical waveguide (162) as shown by FIG. 20. Generally, an aperture angle from a single mode fiber is at most about 10 degrees. If the distance between the fiber and the PSD light receiving surface (163) is, for example, 200 µm, the width of a flux of light (corresponding to a spot diameter of beam) is at most about 40 µm, so that the spot size is too small for the axis-alignment carried out by the fiber. The PSD is, however, capable of sensing the most suitable coupling position with a sufficient accuracy. Consequently, it is feasible to practice the present invention by the PSD in such a composition as shown in FIG. 20. The explanation of the axis-alignment procedures is now omitted, because they are absolutely identical to the prior embodiment having lenses.

What we claim is:

1. A method of aligning a first optical device having an optical axis for generating light converging at a focus point with a second optical device having an optical axis provided with a narrow light receiving area comprising the steps of:

supporting the second optical device and a semiconductor position sensitive device having a wide light receiving surface by a supporting plate as the optical axis of the second optical device is in parallel with the optical axis of the semiconductor position sensitive device, and a light receiving area of the second optical device and the light receiving surface of the semiconductor position sensitive device are arranged to be nearly equal in height;

placing the first optical device and the semiconductor position sensitive device face to face;

focusing light emitted from the first optical device on the light receiving surface of the semiconductor position sensitive device;

sensing a focus point of the light from the first optical device by the semiconductor position sensitive device;

calculating two-dimensional differences in position between the focus point and the second optical device;

moving the second optical device and the semiconductor position sensitive device as a body relatively to the first optical device by the two-dimensional differences;

placing the second optical device as being opposite to the focus point of the first optical device; and aligning the optical axis of the first optical device with the optical axis of the second optical device by finely moving the second optical device in direction of increasing light power relatively to the first optical device.

2. An optical axis-alignment method as claimed in claim 1, wherein the first optical device is a semiconductor laser provided with a focus lens.

3. An optical axis-alignment method as claimed in claim 1m wherein the first optical device is an optical fiber module being provided with a focus lens in an end of the first optical device, and forming a focus point of the light introduced from the other end of the first optical device by the lens.

4. An optical axis-alignment method as claimed in claim 1, wherein the second optical device is an optical fiber.

5. An optical axis-alignment method as claimed in claim 2, wherein the second optical device is an optical fiber.

6. An optical axis-alignment method as claimed in claim 3, wherein the second optical device is an optical fiber.

7. An optical axis-alignment method as claimed in claim 1, wherein the second optical device is an optical waveguide.

8. An optical axis-alignment method as claimed in claim 2, wherein the second optical device is an optical waveguide.

9. An optical axis-alignment method as claimed in claim 3, wherein the second optical device is an optical waveguide.

10. An optical axis-alignment method as claimed in claim 1, wherein the first optical device is a semiconductor laser array consisting of a plurality of semiconductor lasers and focus lenses; the second optical device is an optical fiber array consisting of the same number of optical fibers as semiconductor lasers and being arranged in an identical disposition with the semiconductor lasers; one of the semiconductor lasers constituting the array of the first optical device is driven to emit light and a position of the focus point of the light is sensed by the semiconductor position sensitive device being opposite to the semiconductor laser array; another semiconductor laser of the semiconductor laser array is driven to emit light and a position of the focus point of the light is sensed by the same semiconductor position sensitive device; the semiconductor laser array and the optical fiber array are relatively moved according to the position information of two semiconductor lasers and two fibers, whereby each semiconductor laser is opposite to each corresponding fiber; and a fine axis-alignment between the semiconductor laser array and the optical fiber array is carried out.

11. An optical axis-alignment method as claimed in claim 1, wherein a wavelength of light emitted from the first optical device is more than 0.9 µm.

12. An optical axis-alignment method as claimed in claim 2, wherein a wavelength of light emitted from the first optical device is more than 0.9 µm.

13. An optical axis-alignment method as claimed in claim 3, wherein a wavelength of light emitted from the first optical device is more than 0.9 µm.

14. An optical axis-alignment method as claimed in claim 4, wherein a wavelength of light emitted from the first optical device is more than 0.9 µm.

15. An optical axis-alignment method as claimed in claim 5, wherein a wavelength of light emitted from the first optical device is more than 0.9 µm.

16. An optical axis-alignment method as claimed in claim 6, wherein a wavelength of light emitted from the first optical device is more than 0.9 µm.

17. An optical axis-alignment method as claimed in claim 7, wherein a wavelength of light emitted from the first optical device is more than 0.9 µm.

18. An optical axis-alignment method as claimed in claim 8, wherein a wavelength of light emitted from the first optical device is more than 0.9 µm.

19. An optical axis-alignment method as claimed in claim 9, wherein a wavelength of light emitted from the first optical device is more than 0.9 µm.

20. An optical axis-alignment method as claimed in claim 10, wherein a wavelength of light emitted from the first optical device is more than 0.9 µm.

21. An apparatus of aligning a first optical device for generating light converging at a point with a second optical device provided with a narrow light incident area comprising:

a semiconductor position sensitive device having a light receiving surface and a plurality of pairing electrodes placed on the light receiving surface, and being capable of obtaining coordinates of incident light by measuring photocurrents flowing to each electrode;

a sensor supporting plate supporting the second optical device and the semiconductor position sensitive device in a body;

an XYZ driving system of driving the sensor supporting plate and the first optical device in XYZ directions relatively;

a driving electric power source of driving the first optical device;

a light power meter of detecting an intensity of the light entering the second optical device;

a position computing apparatus of computing the incident light point at the light receiving surface of the position sensitive device; and a controller of driving the XYZ driving system in order to move the second optical device to a focus point of the first optical device by calculating differences in position between the incident light point and the second optical device, and of moving the second optical device in direction of increasing the light power by the signals from the light power meter.

22. An optical axis-alignment apparatus as claimed in claim 21, wherein the position sensitive device is a two-dimensional semiconductor position sensitive device.

23. An optical axis-alignment apparatus as claimed in claim 22, wherein the semiconductor position sensitive device chip is composed of a first conductive type semiconductor substrate, a first conductive type epitaxial growth layer formed on the semiconductor substrate, a first electrode formed in a reverse surface of the substrate, a second conductive type region selectively formed on a part of the epitaxial growth layer, a second, third, forth and fifth electrodes formed on four places of the second conductive type region, a protection layer formed on ends of a pn-junction of the epitaxial growth layer, and an anti-reflection layer formed on a surface of the second conductive region as a light receiving layer.

24. An optical axis-alignment apparatus as claimed in claim 23, wherein a wavelength of light emitted from the first optical device ranges from 0.9 μm to 1.7 μm, the first conductive substrate of the position sensitive device is an n-type InP substrate, the first conductive type epitaxial growth layer consists of an n-type InP buffer layer, an n-type InGaAs light receiving layer, an n-type InP window layer, a p-type region is formed by Zn diffusion on the n-type InGaAs light receiving layer and the n-type InP window layer on the center part of a chip, four electrodes are formed in four sides of the p-type region, and X-coordinate of an incident point of light is obtained by calculating $(X_1-X_2)/(X_1+X_2)$ and Y-coordinate is obtained by calculating $(Y_1-Y_2)/(Y_1+Y_2)$ where $X_1$, $X_2$, $Y_1$ and $Y_2$ are photocurrents flowing between each p-type electrode and an n-type electrode formed the bottom surface.

25. A method of inspecting optical properties of a first optical device for generating light focussing at a point comprising the steps of:

supporting a second optical device and a semiconductor position sensitive device by a supporting plate as their optical axes are in parallel with each other and their bottoms are arranged to be nearly equal in height wherein the second optical device has two end surfaces, one narrow incident end surface and the other end surface connected with a light power meter;

placing the first optical device and the position sensitive device face to face;

focussing the light from the first optical device on a light receiving surface of the position sensitive device;

sensing a focus point of the first optical device by the position sensitive device;

calculating differences in position between the focus point and the second sensitive device;

moving the second optical device and the position sensitive device in a body relatively to the first optical device;

placing the focus point of the first optical device and the second optical device face to face;

practicing a fine optical axis-alignment by moving the second optical device to the first optical device in direction of increasing light power; and inspecting light power of the first optical device at the most suitable position where a maximum amount of light from the first optical device enters the second optical device.

26. An inspection method as claimed in claim 25, wherein the first optical device is a semiconductor laser provided with a focussing lens.

27. An inspection method as claimed in claim 25, wherein the first optical device is an optical fiber module provided with a focussing lens at an end and a light power source at the other end of the optical fiber module, and a focus point is formed in front of the focussing lens by introducing light from the light power source into the end of the fiber module.

28. An inspection method as claimed in claim 25, wherein the first optical device is a semiconductor laser array consisting of a plurality of semiconductor lasers and lenses; the second optical device is an optical array consisting of the same number of optical fibers as the semiconductor lasers and being arranged in an identical disposition with the semiconductor lasers; one of the semiconductor lasers constituting the array of the first optical device is driven and a focus position of the driven semiconductor laser is sensed by the semiconductor position sensitive device being opposite to the laser array; another semiconductor laser of the semiconductor laser array is excited and a focus position of the driven semiconductor laser is sensed by the same semiconductor position sensitive device; the semiconductor laser array and the optical fiber array are relatively moved according to the position information of two semiconductor lasers obtained by the semiconductor position sensitive device, whereby each semiconductor laser is opposite to each corresponding fiber; fine axis-alignment between the semiconductor laser array and the optical fiber array is carried out; and light power of the lasers in the arrays is inspected at the most suitable position by the light power meter set on the end of the fiber in the fiber array.

29. An inspection method as claimed in claim 25, wherein a light wavelength of the first optical device is measured besides the light power of light of the first optical device.

30. An inspection method as claimed in claim 26, wherein a light wavelength of the first optical device is measured besides the light power of the first optical device.

31. An inspection method as claimed in claim 27, wherein a light wavelength of the first optical device is measured besides the light power of the first optical device.

32. An inspection method as claimed in claim 28, wherein a light wavelength of the first optical device is measured besides the light power of the first optical device.

33. An inspection apparatus of inspecting optical properties of a first optical device for generating light focussing at one point comprising:

a second optical device provided with a narrow incident area that is aligned with the first optical device;

a semiconductor position sensitive device provided with a light receiving surface, a plurality of pairing electrodes formed on the light receiving surface, and a bottom electrode for obtaining coordinates of an incident point by measuring photocurrents flowing from the bottom electrode to each electrode;

a sensor supporting plate of supporting the second optical device and the semiconductor position sensitive device in a body;

an XYZ driving system of driving the sensor supporting plate relatively to the first optical device in XYZ directions;

a driving power source of driving the first optical device;

a light power meter of sensing an intensity of light entering the second optical device;

a position computing apparatus of computing the incident point of light on the light receiving surface of the position sensitive device; and a controller of driving the XYZ driving system in order to move the second optical device to a focus point of the first optical device by differences in position between the incident point and the second optical device, and of moving the fine second optical device in direction of increasing light power.

34. An inspection apparatus as claimed in claim 33, wherein the position sensitive device is a two-dimensional semiconductor position sensitive device.

35. An inspection apparatus as claimed in claim 34, wherein the semiconductor position sensitive device chip is composed of a first conductive type semiconductor substrate, a first conductive type epitaxial growth layer formed on the semiconductor substrate, a first electrode formed on a reverse surface of the substrate, a second conductive type region selectively formed on a part of the epitaxial growth layer, a second, third, forth and fifth electrodes formed on four places of the second conductive type region, a protection layer formed on ends of a pn-junction of the epitaxial growth layer, and an anti-reflection layer formed on a surface of the second conductive region as a light receiving layer.

36. An inspection apparatus as claimed in claim 35, wherein a wavelength of light emitted from the first optical device ranges from 0.9 μ to 1.7 μm, and wherein the first conductive substrate of the position sensitive device is an n-type InP substrate, the first conductive type epitaxial growth layer consists of an n-type InP buffer layer, an n-type InGaAs light receiving layer, an n-type InP window layer, a p-type region is formed by Zn diffusion on a central part of the n-type InGaAs light receiving layer and the n-type InP window layer, four electrodes are formed on four sides of the p-type region, and an X-coordinate is obtained by calculating $(X_1-X_2)/(X_1+X_2)$ and a Y-coordinate is obtained by calculating $(Y_1-Y_2)/(Y_1+Y_2)$ where $X_1$, $X_2$, $Y_1$ and $Y_2$ are photocurrents flowing between each p-type electrode and the n-type electrode formed the bottom surface.

37. A method of producing an optical module having an axis-alignment between a first optical device for generating light focussing at a point and a second optical device provided with a narrow incident area comprising the steps of:

supporting a second optical device and a semiconductor position sensitive device by a supporting plate as their optical axes are in parallel with each other and their end surfaces are arranged to be nearly equal in height wherein the second optical device has two end surfaces, one narrow incident end surface and the other end surface connected with a light power meter;

placing the first optical device and the position sensitive device face to face;

focussing the light from the first optical device on a light receiving surface of the position sensitive device;

sensing a focus point of the first optical device by the position sensitive device;

calculating differences in position between the focus point of the first optical device and the second optical device;

moving the second optical device and the position sensitive device in a body relatively to the first optical device by the differences;

placing the second optical device face to face with the focus point of the first optical device;

practicing a fine optical axis-alignment by moving the second optical device in direction of increasing light power relatively to the first optical device; and coupling the first optical device with the second optical device at the most suitable position where a maximum amount of light from the first optical device enters the second optical device.

38. A method of producing an optical module as claimed in claim 37, wherein the first optical device is a semiconductor laser provided with a focussing lens.

39. A method of producing an optical module as claimed in claim 37, wherein the first optical device is an optical fiber module provided with a focus lens in an end, and a focus point is formed by an incident light introduced from the other end.

40. A method of producing an optical module as claimed in claim 37, wherein the second optical device is an optical fiber.

41. A method of producing an optical module as claimed in claim 38, wherein the second optical device is an optical fiber.

42. A method of producing an optical module as claimed in claim 39, wherein the second optical device is an optical fiber.

43. A method of producing an optical module as claimed in claim 37, wherein the second optical device is an optical waveguide.

44. A method of producing an optical module as claimed in claim 38, wherein the second optical device is an optical waveguide.

45. A method of producing an optical module as claimed in claim 39, wherein the second optical device is an optical waveguide.

46. A method of producing an optical module as claimed in claim 37, wherein the first optical device is a semiconductor laser array consisting of a plurality of semiconductor lasers and lenses; the second optical device is an optical fiber array consisting of the same number of optical fibers as the semiconductor lasers and being arranged in an identical disposition with the semiconductor lasers; one of the semiconductor lasers constituting the laser array is driven and a position of the light of the laser is sensed by the semiconductor position sensitive device being opposite to the semiconductor laser array; another semiconductor laser in the semiconductor laser array is driven and a position of the light of the laser is sensed by the same semiconductor position sensitive device; the semiconductor laser array and the optical fiber array are relatively moved according to the position information of the semiconductor laser obtained by the semiconductor position sensitive device, whereby each semiconductor laser is opposite to each corresponding fiber; and a fine optical axis-alignment between the semiconductor laser array and the optical fiber array is carried out.

47. A method of producing an optical module as claimed in claim 37, wherein a wavelength of light emitted from the first optical device is longer than 0.9 μm.

48. A method of producing an optical module as claimed in claim 38, wherein the wavelength of light emitted from the first optical device is longer than 0.9 μm.

49. A method of producing an optical module as claimed in claim 39, wherein the wavelength of light emitted from the first optical device is longer than 0.9 μm.

50. A method of producing an optical module as claimed in claim 40, wherein the wavelength of light emitted from the first optical device is longer than 0.9 μm.

51. A method of producing an optical module as claimed in claim 41, wherein the wavelength of light emitted from the first optical device is longer than 0.9 μm.

52. A method of producing an optical module as claimed in claim 42, wherein the wavelength of light emitted from the first optical device is longer than 0.9 μm.

53. A method of producing an optical module as claimed in claim 43, wherein the wavelength of light emitted from the first optical device is longer than 0.9 μm.

54. A method of producing an optical module as claimed in claim 44, wherein the wavelength of light emitted from the first optical device is longer than 0.9 μm.

55. A method of producing an optical module as claimed in claim 45, wherein the wavelength of light emitted from the first optical device is longer than 0.9 μm.

56. A method of producing an optical module as claimed in claim 46, wherein the wavelength of light emitted from the first optical device is longer than 0.9 μm.

57. An apparatus of producing an optical module having a first optical device generating light focussing at one point and a second optical device provided with a narrow incident area comprising:

a semiconductor position sensitive device provided with a light receiving surface, a plurality of electrodes formed on the light receiving surface, and a bottom electrode for obtaining coordinates of an incident point of light by measuring photocurrents flowing from the bottom electrode to each electrode;

a sensor supporting plate supporting the second optical device and the semiconductor position sensitive device in a body;

an XYZ driving system for driving the sensor supporting plate relatively to the first optical device in XYZ directions;

a driving power source of driving the first optical device;

a light power meter of sensing an intensity of light entering the second optical device;

a position computing apparatus of computing the incident point of light on the light receiving surface of the position sensitive device;

a controller of driving the XYZ driving system in order to move the second optical device to a focus point of the first optical device by the calculated difference between the incident point and the second optical device, and of moving the second optical device in direction of increasing light power by signals from the light power meter; and a welding apparatus of welding the first optical device to the second optical device at an optimum position of axis-alignment therebetween.

58. An apparatus of producing an optical module as claimed in claim 57, wherein the position sensitive device is a two-dimensional semiconductor position sensitive device.

59. An apparatus of producing an optical module as claimed in claim in claim 58, wherein the semiconductor position sensitive device chip is composed of a first conductive type semiconductor substrate, a first conductive type epitaxial growth layer formed on the semiconductor substrate, a first electrode formed on a reverse surface of the substrate, a second conductive type region selectively formed on a part of the epitaxial growth layer, a second, third, forth and fifth electrodes formed on four places of the second conductive type region, a protection layer formed on ends of a pn-junction of the epitaxial growth layer, and an anti-reflection layer formed on a surface of the second conductive type region as a light receiving layer.

60. An apparatus of producing an optical module as claimed in claim in claim 59, wherein a wavelength of light emitted from the first optical device ranges from 0.9 μm to 1.7 μm, wherein the first conductive type substrate of the position sensitive device is an n-type InP substrate, the first conductive type epitaxial growth layer consists of an n-type InP buffer layer, an n-type InGaAs light receiving layer, an n-type InP window layer, a p-type region is formed by Zn diffusion on a central part of the n-type InGaAs light receiving layer and the n-type InP window layer, four electrodes are formed on four sides of the p-type region, and an X-coordinate is obtained by calculating $(X_1-X_2)/(X_1+X_2)$ and a Y-coordinate is obtained by calculating $(Y_1-Y_2)/(Y_1+Y_2)$ where $X_1$, $X_2$, $Y_1$ and $Y_2$ are photocurrents flowing between each p-type electrode and the n-type electrode formed the bottom surface.

* * * * *